US011662474B2

(12) United States Patent
Gick et al.

(10) Patent No.: US 11,662,474 B2
(45) Date of Patent: May 30, 2023

(54) SATELLITE BASED POSITIONING NAVIGATION AND TIMING SYSTEM, METHOD AND COMPUTER PROGRAM PRODUCT

(71) Applicant: TrustPoint, Inc., Leesburg, VA (US)

(72) Inventors: Jeffrey Gick, Leesburg, VA (US); John Hildebrand, Round Hill, VA (US); Simon Dawson, Culpeper, VA (US); Patrick Shannon, Mountain View, CA (US); George Schmitt, Washington, DC (US)

(73) Assignee: TRUSTPOINT, INC., Leesburg, VA (US)

( * ) Notice: Subject to any disclaimer, the term of this patent is extended or adjusted under 35 U.S.C. 154(b) by 0 days.

(21) Appl. No.: 17/865,396

(22) Filed: Jul. 15, 2022

(65) Prior Publication Data

US 2022/0350032 A1  Nov. 3, 2022

Related U.S. Application Data

(63) Continuation of application No. PCT/US2022/014274, filed on Jan. 28, 2022.

(60) Provisional application No. 63/143,238, filed on Jan. 29, 2021.

(51) Int. Cl.
*G01S 19/21* (2010.01)
*G01S 19/03* (2010.01)

(52) U.S. Cl.
CPC .......... *G01S 19/215* (2013.01); *G01S 19/03* (2013.01)

(58) Field of Classification Search
CPC ........ G01S 19/215; G01S 19/03; G01S 19/02; G01S 19/01
See application file for complete search history.

(56) References Cited

U.S. PATENT DOCUMENTS

| 7,120,198 | B1 * | 10/2006 | Dafesh ............... H04L 27/3461 342/357.395 |
| 7,952,519 | B1 | 5/2011 | Nielsen et al. |
| 10,732,290 | B2 * | 8/2020 | Fernandez Hernandez ................. H04L 9/3242 |
| 2011/0188597 | A1 | 8/2011 | Agee et al. |
| 2016/0011318 | A1 | 1/2016 | Cohen |
| 2016/0146947 | A1 | 5/2016 | Davies et al. |
| 2017/0285171 | A1 | 10/2017 | Ries |

OTHER PUBLICATIONS

International Search Report and Written Opinion dated May 3, 2022, received for PCT Application PCT/US2022/014274, filed on Jan. 28, 2022, 18 pages.

* cited by examiner

*Primary Examiner* — Cassi J Galt
(74) *Attorney, Agent, or Firm* — Xsensus LLP

(57) ABSTRACT

A receiver authenticates a wideband (WB) signal from global navigation satellites (GNSS) using a narrowband (NB) signal that is also transmitted from the satellites. The NB signal includes segments that are transmitted in time and frequency slots of successive transmission frames. The NB signal is less susceptible to a smart WB jammer. Also, the NB signal segments may also be transmitted at a relative power level with respect to the WB signal, where the relative power level may vary in a known pattern so as to distinguish the WB signal of the satellite from a stronger WB signal from a smart jammer.

19 Claims, 17 Drawing Sheets

SATELLITE BASED POSITIONING NAVIGATION AND TIMING SYSTEM, METHOD AND COMPUTER PROGRAM PRODUCT

CROSS-REFERENCE TO RELATED APPLICATIONS

The present application is a Bypass Continuation of PCT Application No. PCT/US2022/014274, filed Jan. 28, 2022 and claims the benefit of the earlier filing date of U.S. Provisional Application No. 63/143,238 filed Jan. 29, 2021, the entire contents of all of which are incorporated herein by reference.

BACKGROUND

Technical Field

The present disclosure relates to satellite based positioning, navigation, and timing (PNT) system, method, and computer program product. A transmission from each satellite includes an auxiliary transmission signal that authenticates the transmission as being from a particular satellite and also serves as a backup signal used for PNT that is not subject to jamming from a "smart jammer" that has a same spreading code as that used by the satellite in its broadband signal. Optionally, the auxiliary transmission may also be used to transmit data for uses other than authentication, position, or timing. Furthermore, the present disclosure is equally applicable to terrestrial PNT systems that uses terrestrial broadcast stations instead of satellites.

Discussion of Background

Global Navigation Satellite Systems (GNSS) include receivers that process signals from one or more satellites from one or more different satellite systems. Example GNSS systems (existing and planned) include global positioning system (GPS), the global navigation satellite system (GLONASS), Galileo, quasi-Zenith satellite system (QZSS), and Beidou.

GNSS receivers rely on correlating a known pseudo random sequence (also called a PN sequence) with the received signal to synchronize to the transmitted signal. For different GNSS systems the PN sequences are different, such as different patterns, different lengths, etc. Typically, the results of correlating the PN sequence to different portions of the received signal are combined to increase the signal-to-noise ratio (SNR). A coherent combination is when the correlation results are added after compensating for phase rotation. One kind of non-coherent combination adds the magnitude of the correlation results. Due to phase differences between the correlation results, the coherent combination provides more SNR gain if the phase is known with sufficient accuracy. In many cases a data bit is modulated onto the PN sequence at the transmitter. This data bit can be seen as a change in phase, so it does not affect the non-coherent combination, but if the phase changes due to the data, bits are not accounted for they can severely degrade the coherent combination.

As a non-limiting example, GPS uses GPS satellites for broadcasting GPS signals having information for determining location and time, which is particularly useful for navigation applications. Each GPS satellite broadcasts a GPS signal having message data that is unique to that satellite. The message for a Coarse/Acquisition (C/A) format of the GPS signal has data bits having twenty millisecond time periods. The twenty millisecond data bits are modulated by a one millisecond pseudorandom noise (PRN) code having 1023 bits or chips. The PRN code for each GPS satellite is distinct, thereby enabling a GPS receiver to distinguish the GPS signal from one GPS satellite from the GPS signal from another GPS satellite. The twenty millisecond GPS data bits are organized into thirty second frames, each frame having fifteen hundred bits. Each frame is subdivided into five subframes of six seconds, each subframe having three hundred bits.

GPS receivers (or GNSS receivers generally) operate in environments where other devices are transmitting energy in a same frequency band as the GPS satellites' transmission signals. The transmissions from the other devices might cause accidental co-channel interference, or might be intentional (i.e., a jammer). However, due to the spreading characteristics of the C/A code (or other direct sequence spread spectrum, DSSS, spreading code) the energy from these other devices are suppressed by the GPS receiver when the receiver coherently correlates the known PN sequence with the received signal from the satellite. This correlation process gives rise to a "spreading gain" of the data that is combined with the C/A code (or other DSSS code) with respect to the interfering energy. Thus, during detection of the data, the receiver has an enhanced signal to interference (SM) ratio by an amount corresponding to the spreading gain. If the jammer's signal is wideband (WB) to cover the same spectrum or more than the GPS WB signal, and the jammer's signal does not have the same C/A (or other DSSS code) used by the GPS satellite, the GPS WB signal will still benefit from their receiver gain, and thus the interference effects of the jammer are greatly suppressed.

SUMMARY

According to an aspect of the present disclosure, a new satellite based satellite based PNT system, method and computer program product are described that augment a standard GNSS wideband (WB) DS SS PNT signal with another time/frequency variable narrowband (NB) signal. The NB signal may be a parallel transmission that is transmitted "on top" of the GNSS WB signal, or time multiplexed with the GNSS WB signal for short periods of time. The GNSS receiver is equipped to receive both the GNSS WB signal and the NB signal, and use the NB signal to authenticate the GNSS WB signal. Under conditions where the receiver determines the GNSS WB signal has been compromised by a stronger illegitimate signal, the receiver may use the features of the NB signal to allow for secondary time and position determination without reliance on the GNSS WB signal, which the receiver knows to be compromised.

Further, as another variation, the NB signal can carry extremely low data rate information to the receiver so as to augment other data elements used to optimize PNT operations or use cases other than authentication, position, and timing. The transmission of data in the NB signal can be used to distribute new keys to individual users, broadcast updated ephemeris information, seed values for code generators, or provide any other data transmit service, either broadcasting the same messages to all users or transmitting messages only meant for individual users or groups of users.

Moreover a receiver is described that authenticates a wideband (WB) signal from global navigation satellites (GNSS) using a narrowband (NB) signal that is also transmitted from the satellites. The NB signal includes segments that are transmitted in time and frequency slots of successive transmission frames. The NB signal is less susceptible to a smart WB jammer. Also, the NB signal segments may also be transmitted at a relative power level with respect to the WB signal, where the relative power level may vary in a known pattern so as to distinguish the WB signal of the satellite from a stronger WB signal from a smart jammer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
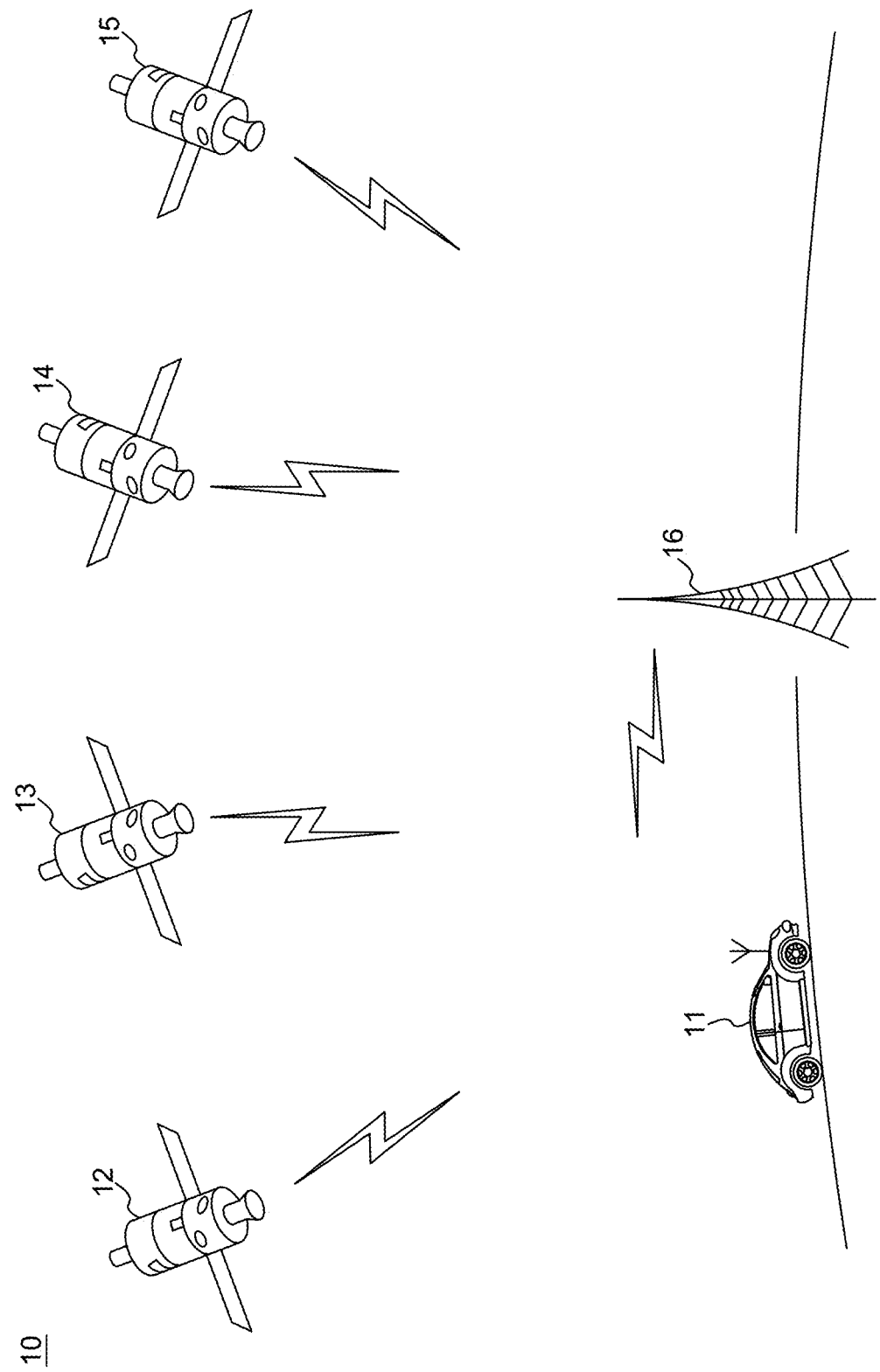
FIG. 1 is a diagram of a GNSS satellite-based position, navigation, timing (PNT) system.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

As recognized by the present inventors, GNSS receivers are susceptible to spoofing if a "smart jammer" has been able to identify in advance the spreading code used by the satellite to spread the data signal before transmission. Presuming the smart jammer uses the same code at the same time as the satellite, and the jammer's signal strength at the receiver is higher than that of the satellite's signal, the receiver will lock on to, and de-spread the jammer's signal. In turn, the receiver will presume the data provided in the jammer's signal is correct and use that incorrect data for whatever application the receiver is using for PNT purposes. This smart spoofing of the receiver is a potentially devastating vulnerability once the satellite's spreading code has been compromised. Further, for conventional broadcast systems, codes are often published in signal specifications used by industry to develop compatible receivers. When codes are not published, they can often be guessed as the best codes are mathematically derived to optimize correlation processes and minimize cross-correlation with other transmitters in the same network. There is evidence that yet-to-be-published spreading codes of new systems such as the early Galileo launches were cracked and known to the global community within a few days of the first Galileo satellites being launched.

The present inventors recognized this vulnerability and identified a need for the GNSS receiver to authenticate the source of the transmission before relying on data contained in that signal for critical PNT applications. Furthermore, the present inventors recognized a need for an alternative source of PNT data when the receiver detects that the wideband GNSS signal may not be authentic. In view of these vulnerabilities identified in conventional GNSS systems, the present inventors have identified a modified, and processing efficient, GNSS transmission and detection architecture that allows for authentication of a GNSS satellite's DSSS signal, identification and authentication of particular satellite's themselves, a secondary synchronization method in a degraded (smart jammer) environment, a secondary time and position information stream in the degraded environment, a secondary low data rate transmission method, and/or a primary method of pre-correlator satellite identification in the case where spreading codes are being reused. While the bulk of this disclosure uses GNSS satellites as the broadcast stations, it should be understood the that the present disclosure also addresses the use of terrestrial broadcast stations (e.g., PNT tower transmitters, equipped with the circuitry and algorithms described herein with reference to the GNSS satellites) as a substitute for the GNSS satellites. Furthermore, a combination of GNSS satellites and terrestrial broadcast stations may be used together as a hybrid system.

Accordingly, one aspect of the present disclosure is the description of a modified GNSS system that incorporates another transmission signal, a NB transmission signal, with NB signal segments that are time and/or frequency hopped in successive transmission frames according to a particular vector pattern unrelated to the WB signal's spreading code. The NB signal need not be spread and thus allows for basic satellite authentication without demodulation or data extraction of data modulated on the NB signal. Because the NB signal is unrelated to the WB signal's spreading code, the NB is resistant to a smart jammer of the WB signal. Furthermore, because respective segments of the NB signal are short in duration and hop in time and/or frequency, it is virtually impossible to mimic in real time. Thus, NB and chirp (transmitters that sweep in frequency and/or time) jammers would largely be ineffective as jammers unless the jammers are located near the receiver and have such high radiated power that they saturate the receiver's front end. To help avoid such scenarios, the receiver optionally includes a bank of NB analog front-end filters that exclude large portions of the jammer's energy that is outside the selected band in which the NB signal is located.

Furthermore, another aspect of the present disclosure is that the reception of the NB signal allows for secondary coarse time and position determination without being susceptible to spoofing. Detection of the particular NB signal segments in expected time/frequency slots of a transmission frame provides the receiver with course timing data that can be used for PNT applications. Furthermore, respective NB signal segments may include phase inversions at particular cycles (e.g., the $5^{th}$ cycle) of the NB waveform segment. These phase inversions an examples of a "blemish" included in the NB signal segment that allows for more accurate time of arrival information, and thus higher time resolution, that may be used for more accurate timing data used in PNT applications. Moreover, phase inversion(s) that are detected as occurring in particular cycles in the segments of the NB signal allow for a more precise secondary time and position determination. Because each satellite implements a different time/frequency transmission pattern for the NB signal, the receiver's detection of a pattern of a NB signal uniquely identifies and authenticates the received signal with the satellite that transmitted it.

FIG. 1 is a diagram of a GNSS satellite-based position, navigation, timing (PNT) system 10. The system includes modified versions of satellites of any of the GPS, GLONASS, Galileo, QZSS, Beidou, or other systems that apply a spreading (higher chip rate) code to a data signal so as to spread the energy of the data over a bandwidth corresponding to the power spectral density (PSD) of the spread signal that is transmitted from the satellite. Alternatively, in another embodiment, ground based transmitters may be used as a substitute for the satellites. In this context the spread signal that is transmitted is referred to herein as a spread signal, direct sequency spread spectrum (DSSS) signal, which is a wideband signal (WB), where wideband refers to a spectral occupancy that is much greater, e.g., at least 10 times greater, than that for a data signal that does not have a spreading code (e.g., course/acquisition, C/A, code for GPS) applied to it. Furthermore, as will be discussed, the present description also refers to a narrowband (NB) signal which may or may not be modulated with a small amount of data, but is not spread by the spreading code. In this instance, NB refers to a signal that has NB signal segments that are transmitted in a short time (e.g., 100 or less, or 10 or less (such as 5, 4, 3, or two) cycles of a dominant frequency) and that may include a phase disturbance (e.g., a tone of 100 or less, or 10 or less, or 5, 4, 3, or 2 cycles, where at least one phase reversal exists). This NB signal, or the segments of the NB signal, are sometimes referred to herein as a "blemish" signal, where "blemish" refers to one or more phase disturbances that occur in particular cycles within the NB signal segments, but nevertheless are distinct (i.e., separately detected) from the WB signal. As will be discussed with reference to FIG. 6B, the NB signal segments and the WB signal may be related by relative transmit power, but the detection processes for the NB signal segments and the WB signal are otherwise independent from one another.

The GNSS Satellite-based PNT system 10 includes modified GNSS satellites 12, 13, 14 and 15, which each transmit a NB signal, as will be discussed, at the same time as, or in a time multiplexed fashion, as a WB signal that is transmitted by each satellite 12-15. A mobile device with a GNSS authentication receiver 11 is shown in line-of-sight with satellites 12-15. As will be discussed, use the NB transmissions from satellites 12-15 authenticate WB transmissions from the satellites 12-15 so that data derived from a correlation process on respective WB signals transmitted from satellites 12-15 is not used unless it is authenticated by the NB signals. Although the mobile device with a GNSS authentication receiver 11 is shown as a car, this is merely illustrative. The receiver may be included in a fixed device that is positioned on the Earth's surface, a mobile device (e.g., a mobile phone held by a person, a car, a boat) that is either stationary or moving, or a device (e.g., an airplane, a satellite) that is above the surface of the Earth.

In many situations, the communication channel experienced by the mobile device with a GNSS authentication receiver 11 while receiving the WB and NB signals is clear of any significant co-channel interference. However, sometimes the communication channel includes transmissions that either cause in-band interference (e.g., out of band intermodulation distortion products, IMD) or hostile transmitters (i.e., "jammers") that purposefully transmit signals in the same spectral band occupied by the WB signal. Jammer 16 may attempt to interfere with proper reception of the WB transmissions from the satellites 12-15 by an overwhelming power (e.g., 10 dB or higher signal strength at the receiver 11's location than the signal strength of the WB transmission from the satellites 12-15 over a comparable band). However, in such a scenario the spreading gain experienced by the receiver 11 when correlating the received WB signal with the spreading code (e.g., C/A code) will distribute the energy of the Jammer 16 over a larger bandwidth, presuming the Jammer 16 has not used the same spreading code at the same time as the satellites 12-15. Thus, the jammer is relatively ineffective because of the suppression effect on the Jammer 16's signal, and the concentration effect of receiver 11 correlating the WB signal with the same spreading code used by the satellites 12-15.

However, if the jammer 16 is a "smart jammer" that is able to apply the same spreading codes applied by respective of the satellites 12-15, the correlation process performed by the receiver 11 will not suppress the smart jammer 16's energy and the receiver might be led to believe the data mixed by the spreading sequence from the smart jammer is the correct PNT data. In this scenario, the present inventors realized there is a significant vulnerability to GNSS systems that do not have an independent way to authenticate the origin of the strongest signal it receives that included the spreading sequences believed to be available only to the satellites 12-15. How the smart jammer 16 obtained the spreading sequence could have happened in any number of ways such as espionage, mathematical derivation, and/or iterative means such as was the case with the codes used by the Galileo system for the spreading sequence.

Figure 2:
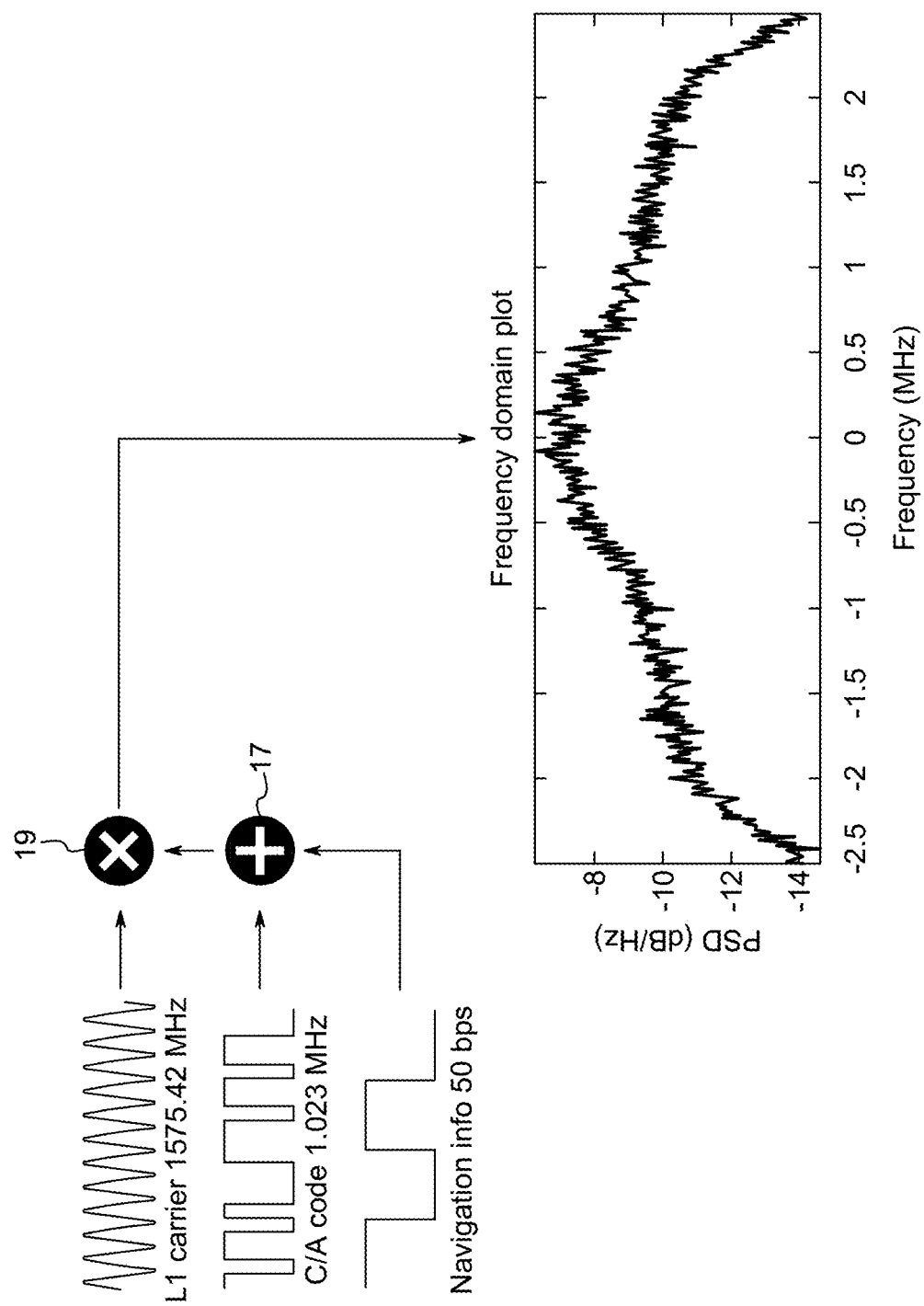
FIG. 2 shows example signals used to generate the WB signal transmitted from GPS satellites.

FIG. 2 shows example signals used by satellites 12-15 to generate the WB signal transmitted from GPS satellites. While GPS is used as an example, the descriptions in this disclosure apply equally well to the architecture of other GNSS system. Moreover, this example is merely illustrative and can be equally well adapted to other GNSS systems. Each system relies on a highly precise clock (usually an atomic clock) to produce a stable frequency (e.g., 10.23 MHz), which is then used to generate a highly precise L1 carrier at 1575.42 MHz, a C/A binary chipping code at 1.023 MHz (1023 chips per 1 ms period), and a 50 Hz binary data signal. The 50 Hz data signal is exclusive-or'ed with the C/A code by Exclusive OR (XOR) logic to produce a binary stream that is mixed by a mixer 19 with the L1 carrier and BPSK modulated to produce the WB signal. FIG. 2 also shows a frequency plot of an exemplary WB GPS signal after passed through a real communication channel. The frequency plot shows the power spectral density (PSD) of the WB signal is spread over a much broader band than what the 50 bps signal would occupy if transmitted without being spread by the C/A code.

Figure 3:
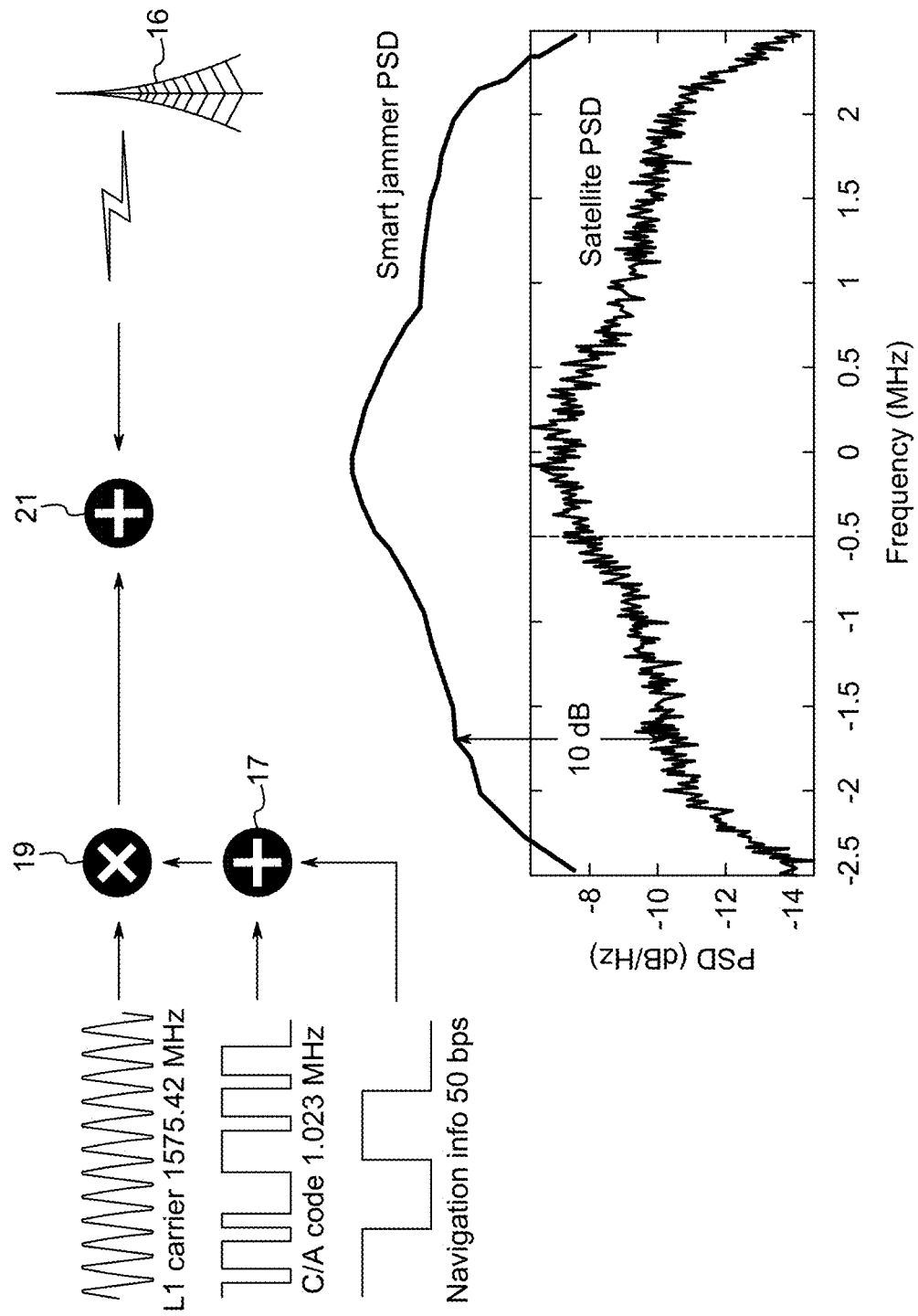
FIG. 3 shows example signals in the presence of a jammer.

FIG. 3 is similar to FIG. 2 but the communication channel also includes the energy added (as shown by additive channel 21) by the jammer 16. In this case, with respect to what is experienced by the receiver 11, the WB signal from the jammer 16 is 10 dB higher than the WB signal from one of the satellites 12-15. Assuming the jammer 16 is a smart jammer (i.e., spreads its purposefully deceptive data with the same spreading code used by the transmitting satellite), the correlation process performed by the receiver 11 will not provide any processing gain that boosts the satellite's data signal over the jammer's data signal. Therefore, without any further information, the receiver 11 might be duped into believing the data detected by the receiver is from the satellite, when in fact it is from the jammer. Consequences of assuming the jammer's data is the actual GPS data could be catastrophic to any PNT application that relies on accurate GPS data.

Figure 4:
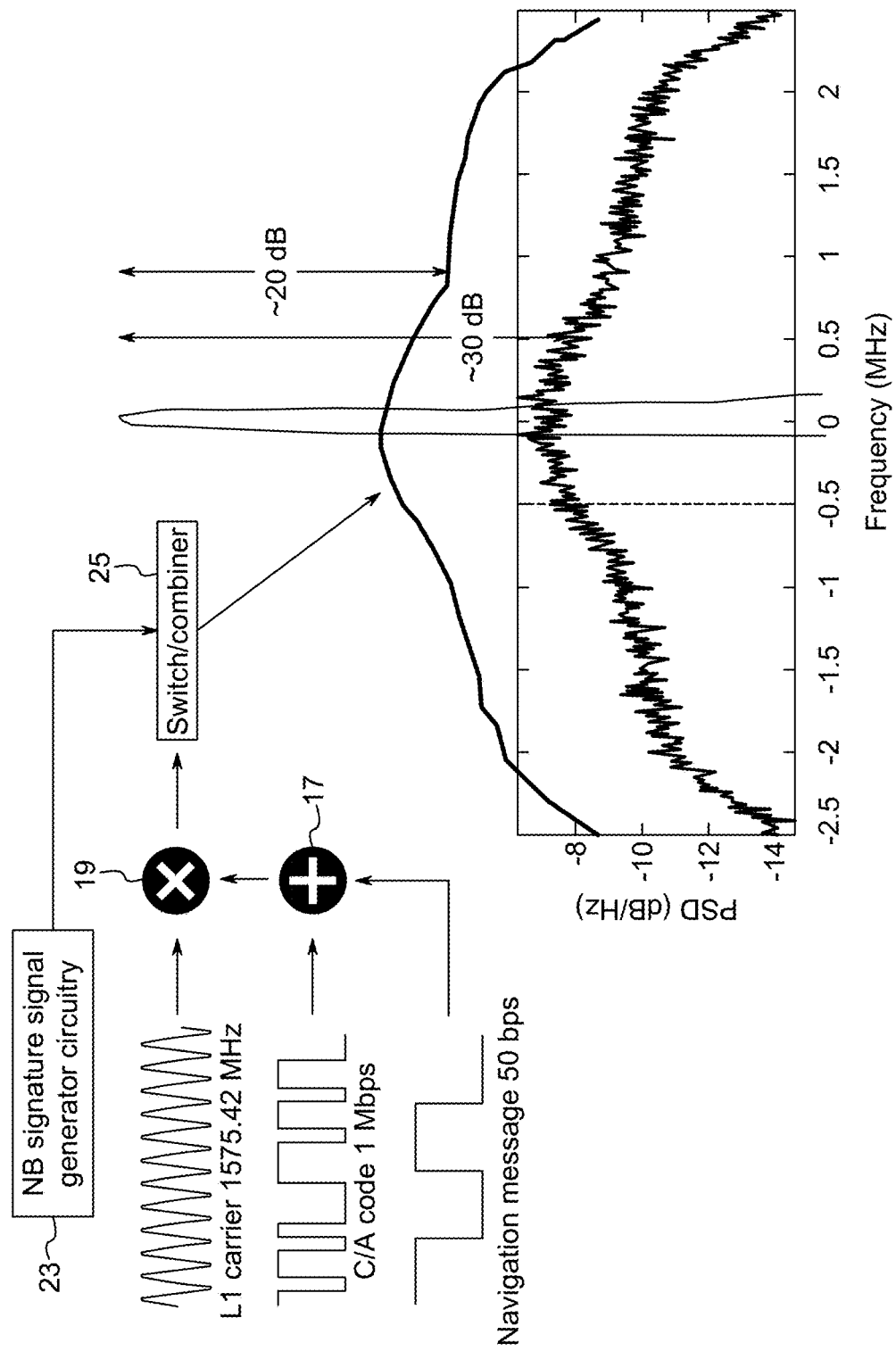
FIG. 4 shows further examples of signal but the transmission circuitry of the satellite also transmits another signal, a NB signal with NB signature signal generator circuitry.

FIG. 4 is similar to FIG. 3, but the transmission circuitry of the satellite (one of satellites 12-15 in this example) has been modified to generate another signal, a NB signal with NB signature signal generator circuitry 23. The NB signature signal generator circuitry may be implemented with circuitry programmed with software (i.e., a processor that is configured by software to generate the signal generator), application specific logic circuitry, and/or a hybrid. Also, the NB signature signal generator circuitry 23 may be separate circuitry from the circuitry used to generate the GNSS wideband signal, or in in this example the same circuitry used to generate the GNSS that was configured to generate the NB signal. These features will be further discussed in reference to FIGS. 8A and 8B.

In FIG. 4, the NB signal provided by the NB signature signal generator circuitry 23 and the WB signal provided by the mixer 19 are applied to switch/combiner circuitry 25. In one embodiment, the NB signal (which is comprised of a series of NB signal segments, which collectively are referred to as the NB signal) is added to the WB signal and the two signals are transmitted simultaneously from the satellite 13 (or any of the other satellites 12, 14, or 15). However, in another embodiment, segments of the NB signal are time multiplexed with the WB signal such that the satellite 13 coordinates transmissions of the NB and WB signals so they are not transmitted at the same time. As will be discussed, in the embodiment where the NB is time multiplexed with the WB signal, the switch/combiner circuitry 25 selects one of the two signals for amplification and transmission by the satellite 13. As with the NB signature signal generator circuitry 23, the switch/combiner 25 may be implemented with an existing controller that has its software modified to controllably add the two signals before transmission, or switch between the two of them.

In the PSD diagram of FIG. 4, it is presumed the WB signal is 10 dB down from the smart jammer's signal across the entirety of the spectrum occupied by the WB signal. However, the NB signal, which is transmitted on top of the WB signal has a narrow bandwidth (e.g., 2 kHz at a 3 dB bandwidth, or 90% of the energy contained within 4 kHz). In this example, the NB signal is roughly 1000 times (30 dB) more spectrally compact than the WB signal and so the spectral density of the NB signal with respect to the smart jammer 16 is roughly 20 dB greater, assuming total RF power in the WB carrier is of the same magnitude as the RF power in the NB signal. The carrier power in the WB and NB signals do not necessarily need to be equal or close. Consequently, the receiver 11, which knows when and at what frequency to expect segments of the NB signal, has no difficulty distinguishing the presence of the NB signal even when the smart jammer is 10 dB above the WB signal.

Figure 5:
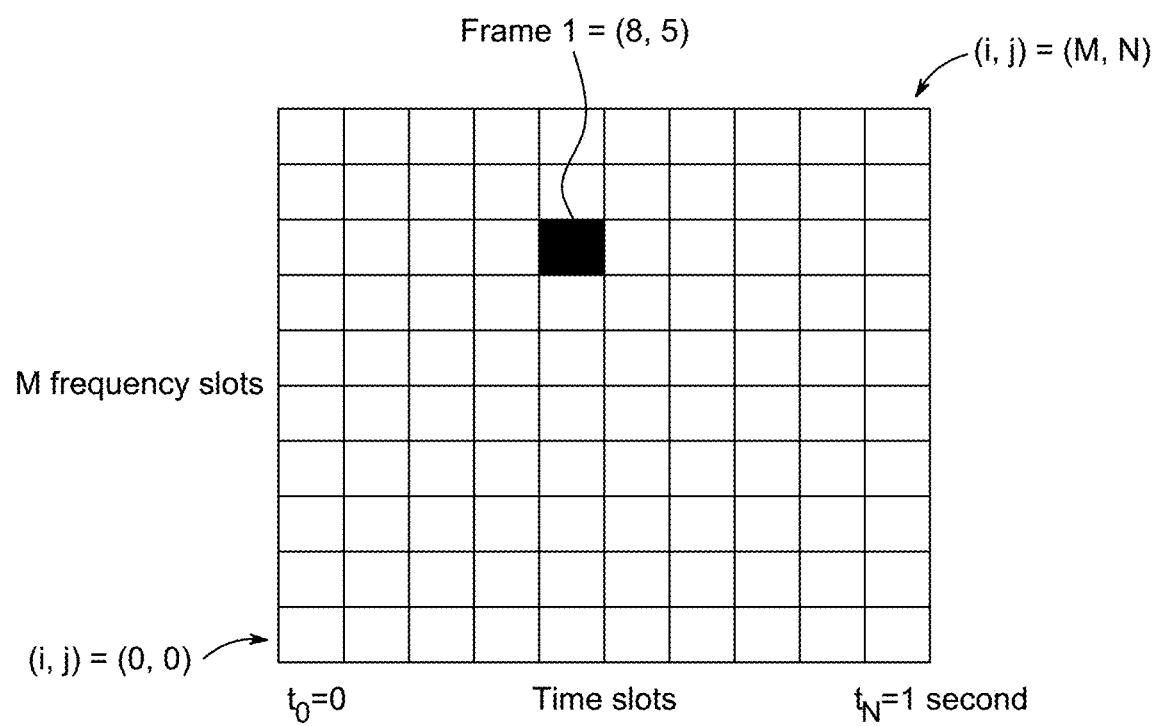
FIG. 5 shows the time/frequency space of a transmission frame.

FIG. 5 shows the time/frequency space of a transmission frame, which in this example is a frame of one second. This time span is merely illustrative and can range from 1 millisecond to 60 seconds, and every frame need not provide an active NB transmission. In the example frame of FIG. 5, there are N time slots divided over the course of 1 second. In another embodiment, the times slots need not be evenly divided across the time span of each frame. In the present example, N is on the order 1000 time slots. Each time slot has M different candidate frequencies that may be used to transmit the NB signal. M is also on the order of 1000, and so each frame has 1,000,000 possible "locations" in the time/frequency space. While the present example includes a NB signal segment of the NB signal occupying one slot per frame, this is merely illustrative. The satellite may also transmit more than one NB signal segments per frame. Assuming two NB signal segments are transmitted per frame, the number of combinations is raised by the power of 2. In the particular example shown in FIG. 5, at Frame 1 the NB signal is transmitted in slot (8, 5), (frequency, time).

In one embodiment the pseudorandom pattern by which the NB follows (vector pattern, as will be discussed) is dynamically generated with a shift key register (and multiple feedback taps such that used by a convolutional code generator) that is set with an seed value, which is shared by the satellite and the receiver. As the generated values are held in a buffer before being used for by the receiver's processing circuitry, it is said to be stored in memory even though the generator dynamically generates the codes used to set the frequency and time values for the transmission frames. As the satellite and the receiver both use the same shift key registration configuration, same clocking of the shift key, and same initial seed value, the satellite and the receiver generate the same output values in a lock-step fashion. Alternatively, the vector pattern may be provided (e.g., via wireless communication that is encrypted or provided via a trusted input source) in the form of a look up table stored at the receiver and at the satellited. The look up table is stored in memory and can be updated via over the air updates.

In this example, the format of the stored data is a three dimensional vector, with three indices, sequential time mark (e.g., a count of the number of seconds since a defined "start time", M, N). M is an index representing a frequency slot, and N is an index representing a time slot. The arrangement of the indices may be reversed as well (i.e., N, M). It is possible that the number of vectors is exhausted with longer use of the satellite. If necessary the memory is segmented into two or more segments, and one portion of the memory is replenished with new vectors via an over the air rekeying from the control segment either on a periodic basis (e.g., weekly, monthly, etc.), as needed, or at random intervals. Similarly, the memories in the receivers are also replenished with vectors so the pattern stored at the receiver aligns with the vector pattern followed by the satellite. If it becomes known that the pattern has been compromised, the risk exists for a smart jammer to follow the same pattern, and become a smart NB jammer. While a NB smart jammer may not be able to spoof the GPS satellite's data, it may deny the receiver an ability to properly detect the NB transmission from the satellite. Thus, if there is an indication the pattern has been compromised, the control segment may remotely reset the patterns stored at the satellite and the receivers by pushing an update signal to the satellites and the receivers.

While the present example explained how a single satellite uses the pseudorandom pattern to generate and transmit a NB signal in an apparent random pattern, it should be understood that each satellite has its own pattern, and each receiver (in the embodiment where the vector pattern is stored in a look up table in memory, as opposed to dynamically created and buffered in memory) has stored in memory the vector pattern for each satellite. To prevent the information stored in the look up table from being extracted by a bad actor, the memory is a secure memory that has the pattern data encrypted, thus making it inaccessible to an end user.

Figure 6A:
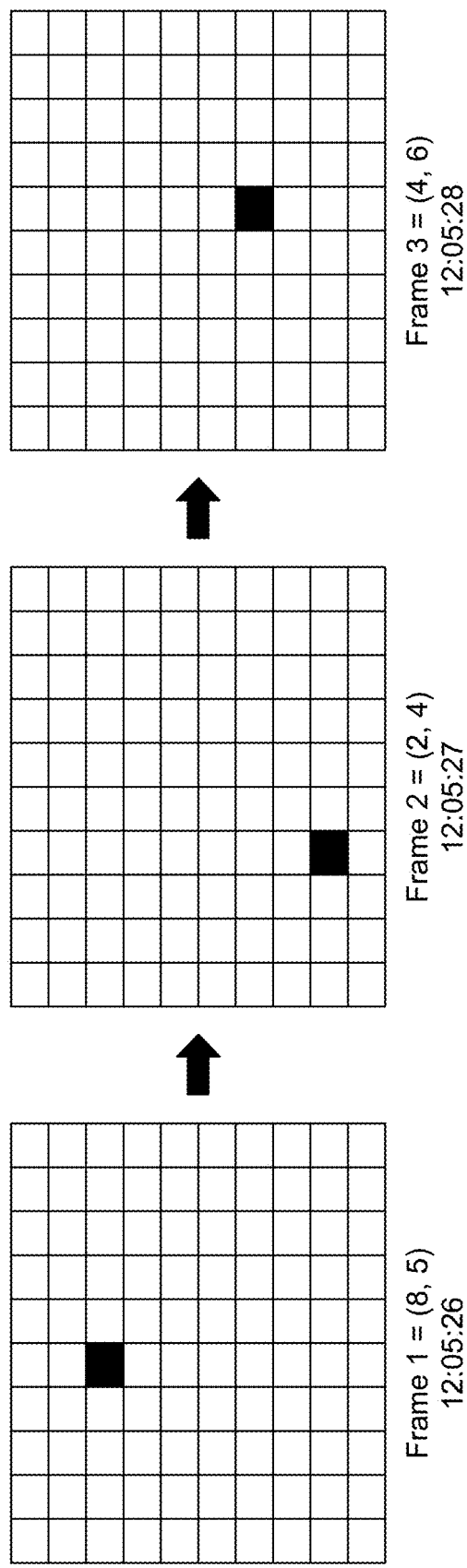
FIG. 6A illustrates an example sequence of three successive one-second frames used to control the time and frequency at which a particular satellite will transmit its NB signal.
Figure 6B:
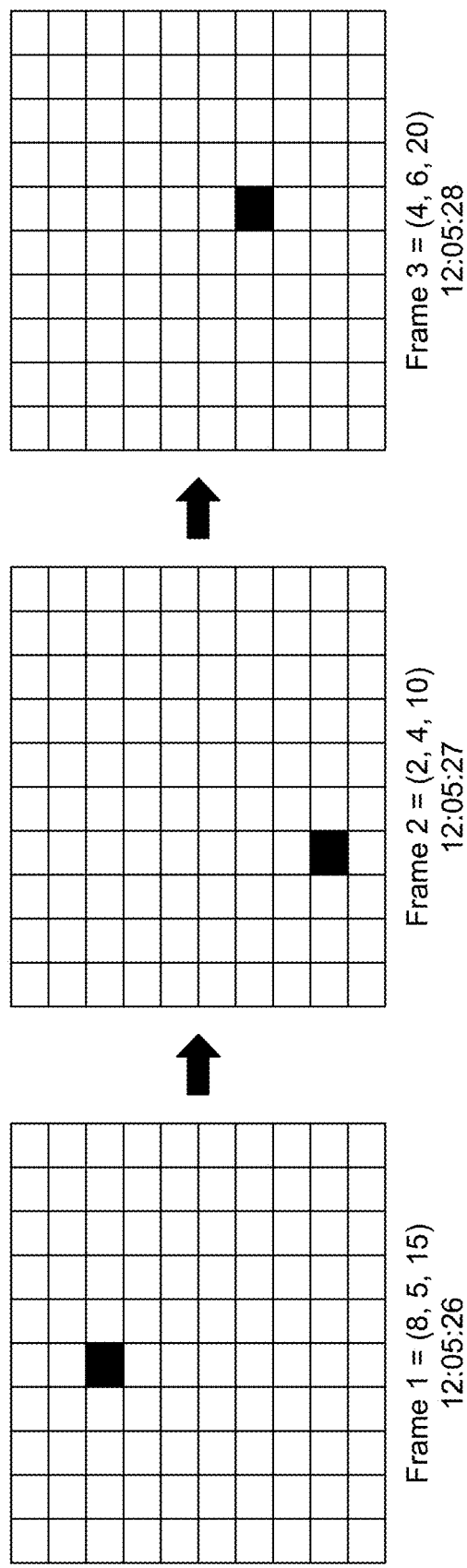
FIG. 6B shows examples of a pattern vector with the components, frequency, time, and relative power.

FIG. 6A illustrates an example sequence of three successive one-second frames used to control the time and frequency at which a particular satellite will transmit its NB signal. A different satellite would transmit its NB signal following a different pattern that is unique that satellite. The frame sequence in FIG. 6A includes a first frame that begins at time 12:05:26, and followed by second and third frames that begin at times 12:05:27 and 12:05:28 respectively. In Frame 1, the vector is (8,5), meaning that the NB signal is transmitted at time slot 5 and at frequency slot 8. The frequency slots may span over an entirety of the spectrum occupied by the WB signal. Frame 2 follows frame one and the controller at the satellite and the controller at the receiver retrieve from memory the vector (2,4), and the satellited transmits the NB signal in the $4^{th}$ time slot at the second frequency, while the receiver looks for the reception of the NB signal in the $4^{th}$ time slot at the second frequency. Likewise, Frame 3 has a vector of (4, 6), meaning that the NB signal is transmitted during the $6^{th}$ slot at the $4^{th}$ frequency.

The controller at the receiver may look for successful detection of the NB signal segments over the course of 10 or more (20, 50, 100, 200 or more) frames before determining that the received pattern of NB signals most certainly was transmitted from the satellite, and thus authenticating the presence of transmission from that satellite. Unless the jammer has access to the pseudo random vector patterns for the NB signals, the jammer will not be able to replicate the NB transmission pattern from the satellite, and thus the receiver will not be able to spoof an authentication. However, the inventors recognize this method does not mitigate the impacts of re-broadcast spoofing attacks, during which an adversary receives and re-transmits the primary WB and NB signals, adding some delay to the signals. As a counter measure for such spoofing attacks, the receiver's correlation process is limited in time to include transmission frames that are within a time span around a present time that accounts for the reception at the jammer of the satellite's WB signal, possible modification of the data carried in the WB signal, rebroadcasting received WB signal, and added time due satellite-to-jammer and jammer-to-receiver propagation distance. As a further example, described in reference to FIG. 6B, the vector may be a three dimensional vector (actually 4 if the transmission frame is considered a dimension). The order of the indices for each vector may be changed to any order. The third index is relative power (NB signal to WB signal over the bandwidth of the NB signal). As shown, in Frame 1, in addition to frequency, time, there is third index for relative power. In the example of Frame 1, the NB signal is transmitted with 15 dB/Hz more power than the WB signal. Then, in the next frame, the satellite's power amplifier is adjusted so the NB signal is dB above the WB signal (in some cases the energy for the NB signal is adjusted and in other cases the energy for the WB signal is adjusted). Likewise, the power amplifier is adjusted again in Frame 3 so the NB signal is 20 dB above the WB signal over a same bandwidth. Adding this third vector creates a non-data relationship between the NB signal and the WB signal so the receiver can determine whether the WB signal is from the satellite or not. For example, if the WB signal is always at a same power level and that power level does not vary with vector pattern, it is an indication that the WB signal is dominated by a jammer. On the other hand, if the relative powers of the NB signal and the WB signal vary according to the power index of the vector, then receiver is able to further distinguish if the WB signal is that of a jammer, or if it is from the satellite.

Figure 7:
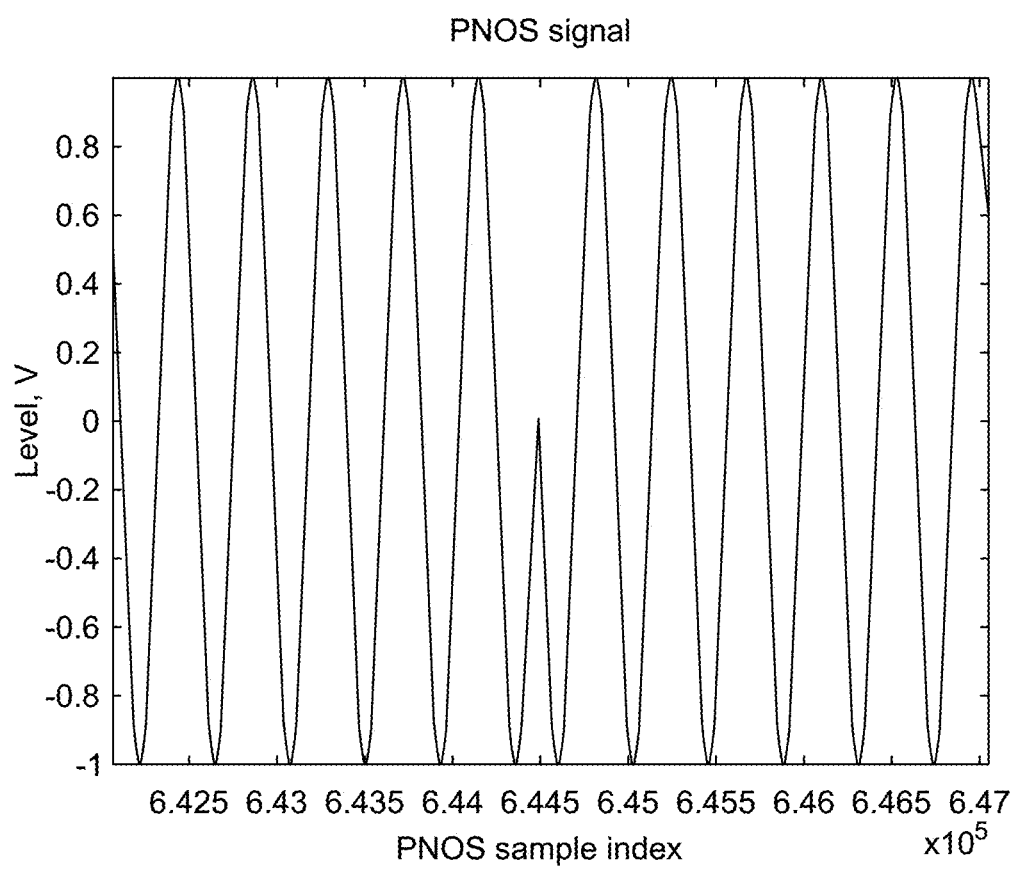
FIG. 7 shows one example of a NB signal, which may or may not include a "blemish".

FIG. 7 shows one example of a NB signal segment that includes a blemish, or a "blemish" signal. In this example the blemish occurs in the $5^{th}$ cycle of the NB signal segment. In FIG. 7, the NB signal segment is represented by samples over a one second period of time vs. voltage. The signal, in this example is a tone, with a single phase reversal (blemish) at the 5th cycle. The intention is this example is not necessarily to encode data (although that is another embodiment) in the phase reversal, but rather have a characteristic waveform that can have a corresponding matched filter at the receiver to detect the location of the blemish at a particular cycle of the NB signal segment during the particular time slot. The NB signal segment may also be a tone itself, a single phase inversion at the center of the 1 second slot; multiple phase inversions over the slot (e.g., slow BPSK, QPSK, QAM, M-ary), polarization reversal of the transmitter energy during the slot; and application of a code such as a Barker code or other binary sequence with desirable qualities as long as it produces a known pattern. Instead of full phase reversals, other distinguishing signal characteristics may be used as well such as minimum shift keying (MSK) for one or a few cycles in a basic tone.

Figure 8A:
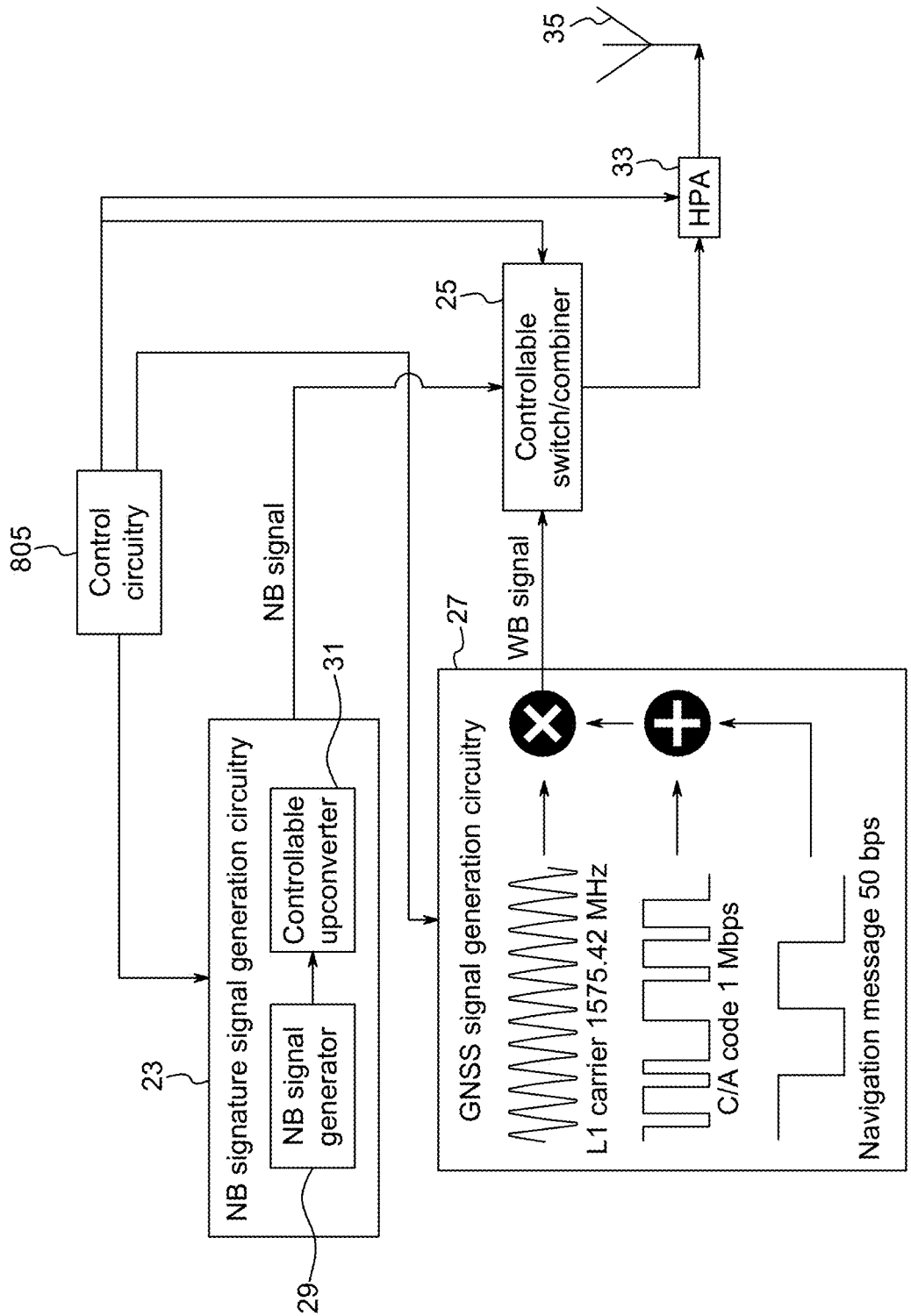
FIG. 8A is a circuit diagram employed by the satellites to generate and transmit the WB signal and the NB signal either in a time-multiplexed fashion or simultaneously.

FIG. 8A is a diagram of the circuitry (programmable and/or fixed), and description of use of the circuitry, employed by the satellites to generate and transmit the WB signal and the NB signal segments either in a time-multiplexed fashion or simultaneously (i.e., the NB signal on top of the WB signal). This configuration may be implemented with existing transmitter hardware and controller circuitry with additional functionality added by way of software that configures the operation of the existing hardware. In FIG. 8A, GNSS signal generation circuitry 27 is hosted at the satellite and includes an atomic clock and baseband frequency generator of 10.23 MHz, carrier frequency generator that generates the L1 carrier (in the example GPS) base on the 10.23 MHz signal applied thereto, a separate time pulse generate that also receives the 10.23 MHz and generates the C/A code at 1023 chips/1 ms period, and a data pulse generator that generates a 50 Hz pulse that clocks in a binary data stream with 1 bit/20 ms. The GNSS signal generation circuitry 27 includes an XOR circuitry (discrete hardware, or programmable hardware) that XOR's the C/A code with the 50 Hz data. A BPSK modulator uses the 1.023 MHz digital stream provided by the XOR circuitry to modulate the L1 carrier with the data and provide a BPSK waveform as the "WB signal" shown in FIG. 8A.

NB signature signal generation circuitry 23 may be implemented in discrete circuitry to produce the NB signal or retrieved from memory as data samples that form the structure of the NB signal. This NB signal is upconverted via a separate controllable upconverter 31 that includes a mixer responsive to input from control circuitry 805 that cause the mixing frequency to vary according to the NB frame pattern as discussed in FIGS. 6A and 6B. The frame pattern is stored in memory held by the control circuitry 805 are retrieved to control the up conversion frequency at a particular time so that the NB signal is transmitted in a frequency slot and time slot specified by the frame pattern vector. Alternatively, the frame pattern is dynamically generated via a shift-register architecture like that previously discussed.

In the present embodiment, the WB signal from the GNSS signal generation circuitry 27 and the NB signal from the NB signature signal generation circuitry 23 are applied to controllable switch/combiner 25, which is controlled by the control circuitry 805. In one embodiment, the control circuitry 805 switches between the NB signal during the time slot at which the NB signal is transmitted, and the WB at during all other time slots. Alternatively, the controllable switch/combiner adds the NB signal to the WB signal so both signals are transmitted at the same time.

The output of the controllable switch/combiner 25 is applied to a high power amplifier (HPA) 33, which in term provides its amplified output signal to transmit antenna 35. In this embodiment the control circuitry 805 controls transmit levels of the NB and WB signals so that the relative transmit power is adjusted to the relative power index discussed with respect to the 3 dimensional vectors (plus information to identify the transmission frame) in FIG. 6B. Thus, the transmit antenna 35 transmits the NB signal according to its assigned frequency slot and time slot according to corresponding vector for a given frame. The transmit antenna 35 also transmits the NB signal and WB signal with adjusted relative power levels according to relative power index for a given frame, as was discussed in reference to FIG. 6B.

Figure 8B:
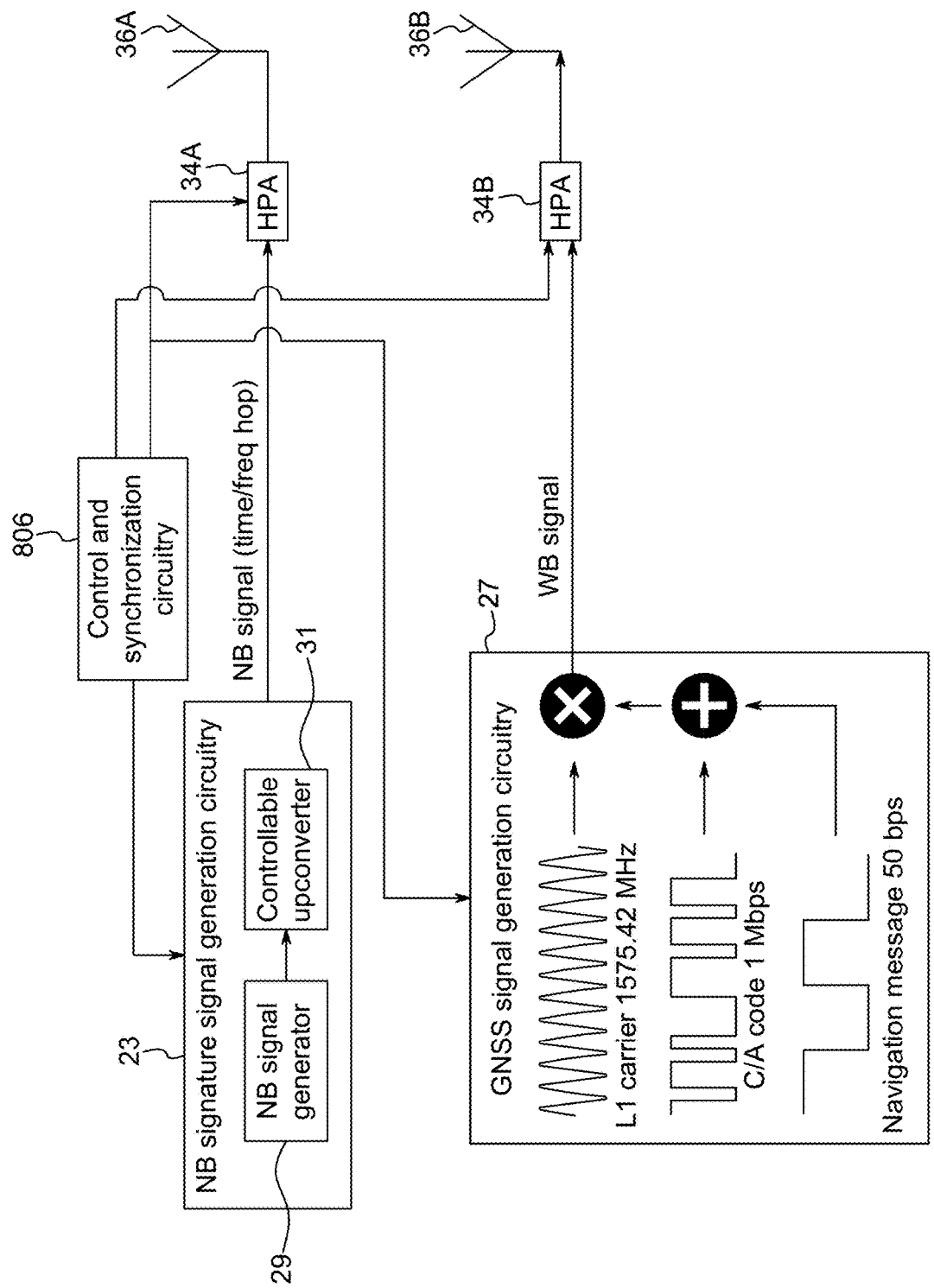
FIG. 8B is another embodiment of the satellite transmitter segment, but includes separate HPAs and transmit antennas.

FIG. 8B is another embodiment of the satellite transmitter segment, but includes separate HPAs and transmit antennas. In this embodiment, control and synchronization circuitry 806 controls a HPA 34A to adjust the relative power level of the NB signal, as well as frequency/time slot allocation of the NB signal in a time/frequency hopped fashion according to the pattern vector for a given frame. Thus, the controllable switch/combiner 25 (FIG. 8A) is not applicable in the embodiment of FIG. 8B. Likewise in FIG. 8B the control and synchronization circuitry 806 controls the relative power of the HPA 34B according to the relative power index of the pattern frame for a given frame. The amplified NB signal from the HPA 34A is applied to a NB transmit antenna 36A that transmits the NB signal, and the amplified WB signal from the HPA 34B is applied to a WB transmit antenna 36B, which transmits the WB signal toward Earth. In this embodiment the NB antenna 36A may have a higher degree of directivity or even steerable so as to provide relatively high signal levels in locations where jammers are suspected to be located. As a further embodiment, a single transmit antenna may be used to transmit the NB signal and the WB signal.

Figure 9:
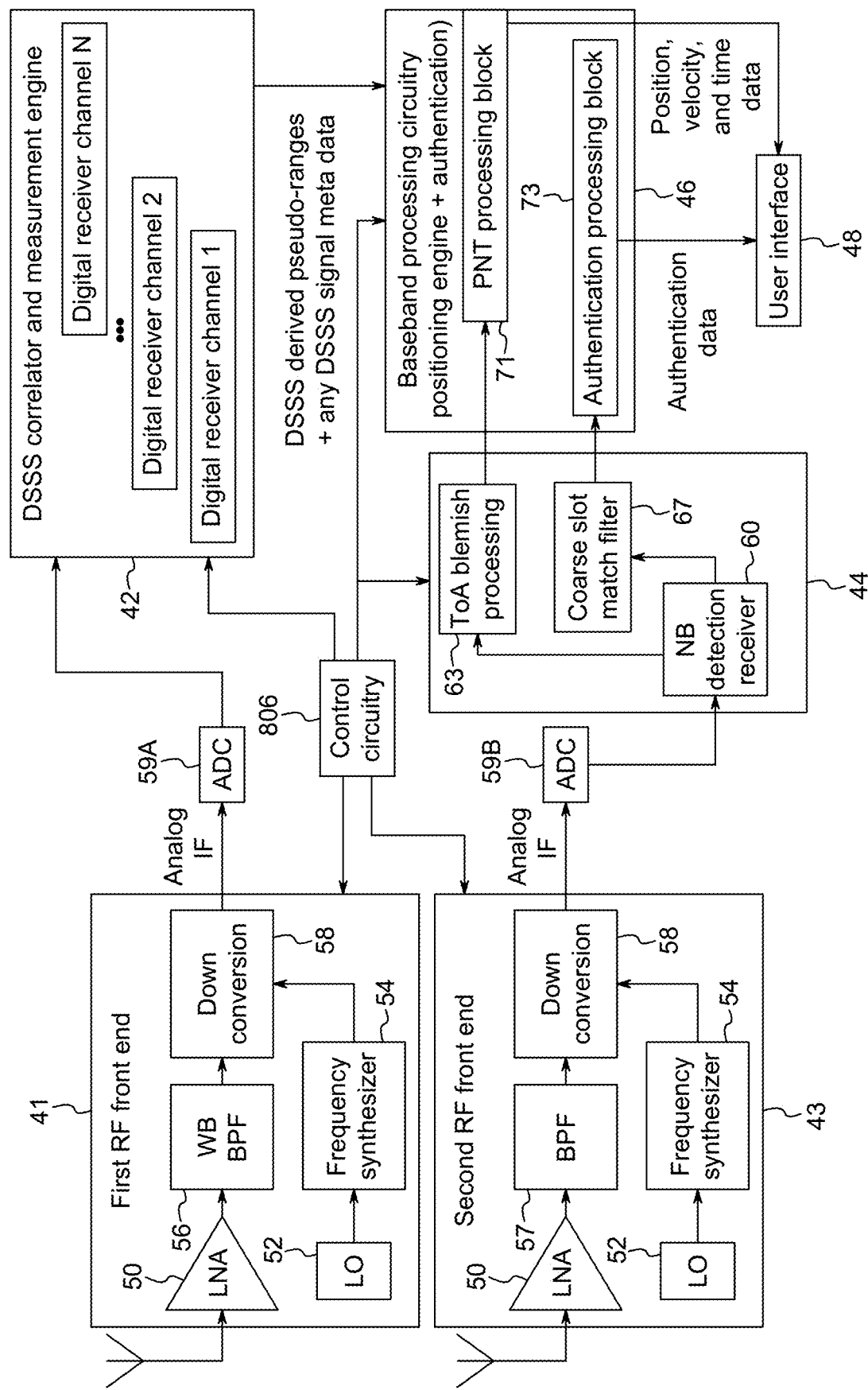
FIG. 9 is a circuit architecture of a GNSS authentication receiver.

FIG. 9 is a circuit architecture of a GNSS authentication receiver 40. The receiver in this embodiment includes a first RF front end 41 and a second RF front end 43. In another embodiment a single RF front end includes a bandwidth sufficient wide to pass the WB signal as well as any center frequency of a corresponding frequency slot in the vector for the frame pattern for the NB signals. In another embodiment the receiver 40 includes two front ends: one for the WB signal, and a second one that has a bank of NB filters sized to pass the NB signal at a particular frequency slot, or a group of frequency slots.

In FIG. 9 the first RF front end 41 conveys a signal from a WB receive antenna to a low noise amplifier 50, which amplifies the WB signal before further processing. The output of LNA 50 is applied to a WB filter with filter characteristics like that shown in FIG. 10, as will be discussed. The passband of the WB filter 56 is wide enough to pass at least 95% of the energy of the WB signal, but reject out of band interference. The WB signal is passed by the WB bandpass filter 56 to down conversion circuitry 58 that down-converts the WB signal to an analog intermediate frequency (IF). The down conversion circuitry 58 receives a stable tone from frequency synthesizer 54, which receives a reference tone from a local oscillator 52.

This embodiment includes the second RF front end 43 which includes similar components to that described above for the first RF front end 41, although instead of necessarily using a WB BPF, a BPF 57 may be used that may be implemented as a bank of NB bandpass filters with respective bandwidths distributed across the spectrum occupied by the WB signal, and with each bandpass filter sized to pass the NB signal but not the WB signal. The analog IF from the second RF front end 43 is applied to an analog to digital converter 59B, which converts the analog IF into the digital domain (digital IF) for downstream processing. The digital IF is applied to a NB measurement engine 44, which comprises one or more CPU's, GPU's, ASIC's or the like that are programmed with code contained in memory to first detect the NB signal in NB detection receiver 60, and then determine its time of arrival (ToA) with ToA processor 63 (e.g., a phase detector that identifies a blemish in a NB signal segment, where the location of the blemish in the NB signal segment is known a priori), and extract the amount of energy and phase of the NB signal with a matched filter 67 that allows for slot detection and thus crude time detection by associating the time corresponding to an occupied slot detected for a particular transmission frame. More precise time data is available from the blemish detection as it allows for the time to be tracked down to a particular cycle of the NB signal segment as opposed to time information extracted from the presence of a NB signal segment in a particular time slot of a transmission frame. Some or all of second RF front end 43, digital converter 59B and NB measurement engine 44 may be considered to be narrow band receiver circuitry.

The analog IF from the first RF front end 41 is digitized with ADC 59A before being applied to DSSS correlator and measurement engine 42, some or all of which being considered to form wideband receiver circuitry which is also implemented with the same or different CPU's. GPU's. ASIC's or the like that are programmed with the spreading code contained in memory. These correlations are performed with N different digital receivers that process the wideband signal to de-spread, and detect the data contained in the WB signal.

DSSS derived pseudo-ranges and DSSS signal meta data are provided from the DSSS Correlator and Measurement engine 42, to baseband processing circuitry 46, which identifies PNT information from PNT processing block 71, according to standard PNT processing techniques for GNSS WB signals. However, the PNT processing block also accepts as input ToA information from the ToA blemish processing circuitry 63, and based on this input data compares the same with the expected time slot for a particular NB blemish. Thus, this comparison of NB blemish receipt time to actual known time provides sufficient information to identify a distance from the satellite based on a phase (time) shift experienced in the NB blemish. The respective phase differences experienced by NB blemishes from four different satellites allows for the receiver's position to be determined via trilateration from expected distances/phases differences for different satellites. Thus, in addition to timing, distance information and thus position information may be determined. Change in position over time is determined as well and identified as velocity of the receiver. Each of the front-ends and engines (42, 44, and 46) operate under control of the control circuitry 806. Moreover, the control circuitry 806 and processing engines may be implemented on common hardware with software code stored in memory and executed to perform the above described operations.

The baseband processing circuitry 46 also performs authentication of the WB signals from the satellite by comparing the detection of the NB signal in the proper frequency, time vector for a predetermined number of successive frames. This authentication determination may be made on a frame by frame basis, or over a series a frames with a certain percentage of frames (e.g., 95%) having the NB signal confirmed to have been detected in the expected frequency, time slot for each given frame. The authentication block 73 includes in memory a copy of the vector pattern for the NB signal over a large set of frames and this copy of the vector pattern is used for comparison with NB signals as they are received over time. As previously discussed a code generator by also be used to generated the vector patterns, and the code generator is implement in the authentication block 73.

Furthermore, the baseband processing circuitry 46 also compares the relative power levels of the received NB signals with respect to the WB signals. If the difference in relative power levels of the NB signals and WB signal experienced by the authentication processing block 73 on a frame-by-frame basis matches with an average of 3 dB or less (or another threshold configurable by the user or system conditions such as 1, 2, 4, 5 or 6 dB), the authentication processing block 73 issues an output to a user interface 48 indicating whether the position, velocity, time data provided the PNT processing block 71 is from the WB signal (i.e., if the WB is authenticated by the authentication processing block 73) or the position, velocity, time data is more crude because it is obtained from the NB signals. The user interface 48 may provide this authentication information to applications that receive position, velocity, time data from the GNSS authentication receiver 40, so the application may make necessary adjustments in light of the quality of velocity, time data it is receiving.

The WB signal may also be authenticated by a presence or an absence of the NB signal itself. For example, if the receiver 40 detects and receives the WB signal, but fails to receive at least two NB signal segments in succession, then the receiver is configured to determine that the WB cannot be authenticated because it is received in the absence of the NB signal. The threshold on presence/absence of the NB signal is controllable based on the level of certainly expected of the receiver 40. For example, 90% successful reception of 100 or more NB signal segments may be used as the threshold. The success rates are adjustable from a s low as 50% up to 100% and the number of NB segments ranges from as few as two transmission frames to over 1000. On the other hand, if the NB signal is present, and the WB signal is also present, it is possible that the WB signal may be from the jammer. Thus, the authentication of the WB signal as being from the satellite may be achieved with the addition of the relative power index as discussed above.

Figure 10:
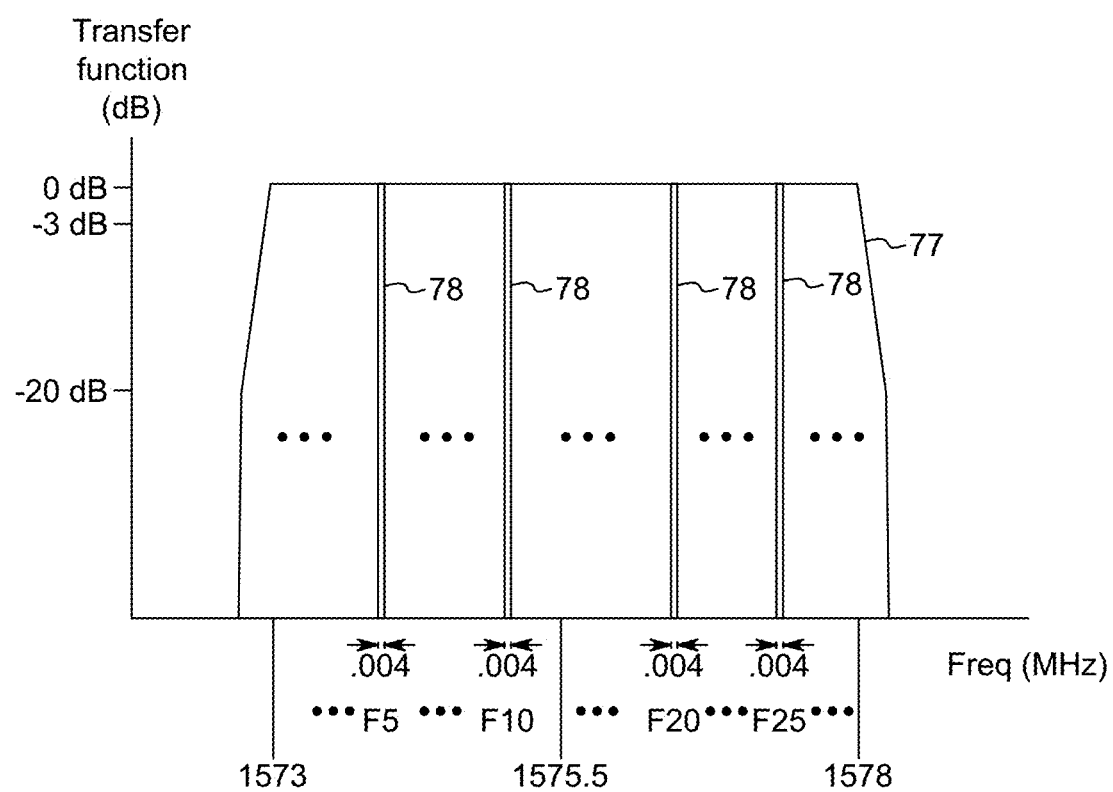
FIG. 10 is a graph of a transfer function of a WB bandpass filter as well as transfer functions for separate NB filters used to isolate the NB signal.

FIG. 10 is a graph of a transfer function of a WB bandpass filter (like that for WB bandpass filter 56 in FIG. 9), as well as transfer functions for separate NB filters used to isolate the NB signal in the presence of a smart jammer. The passbands for NB filters are 4 kHz wide in the example to pass the energy of the NB signal while excluding a very large percentage of WB jammer energy that outside the NB filter's passband. In one embodiment, the NB filter is implemented in the digital domain with computer code executed in a processor. However, the filters may also be implemented in a hardware (similar to a comb filter) to relieve processing burden on the processing circuitry, but also to reject most of the jammer's signal before the receiver converts the received energy into the digital domain. Moreover, if the ADC 59A, 59B does not have sufficient dynamic range, a high jammer signal (perhaps by a jammer close to the GNSS receiver 11) may saturate the RF front-end circuitry and compress the effective dynamic range of the ADC 59A, 59B. A bank of more narrow band filters used in the NB processing chain helps with mitigating saturation during a jamming event.

Figure 11:
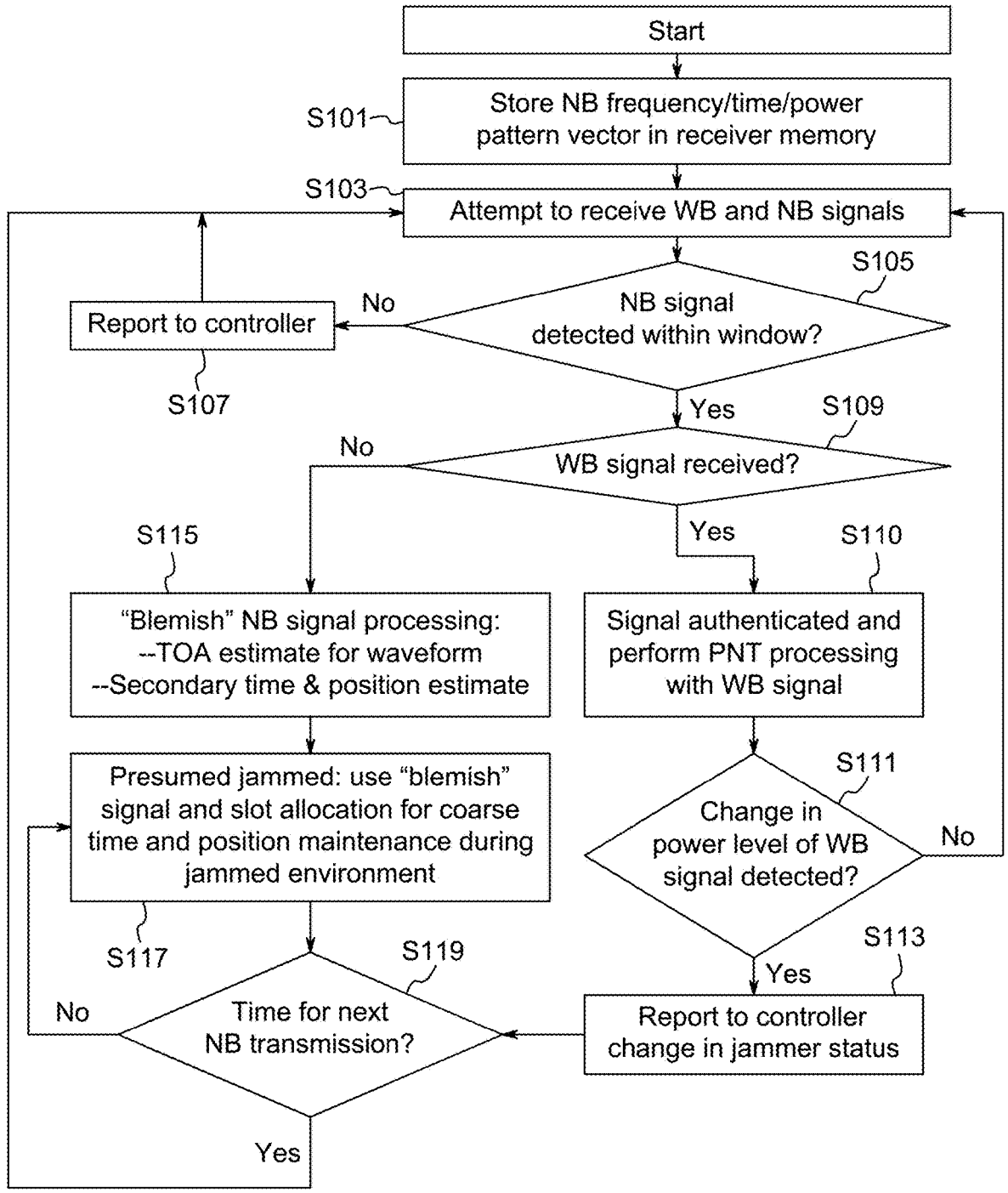
FIG. 11 is a flowchart of a process flow employed by the GNSS receiver.

FIG. 11 is a flowchart of a process flow employed by the GNSS receiver 11. The process begins in step S101 where the receiver stores in memory the frame vectors that are used by the satellite to dictate the frequency, time, and relative power of the NB signals, as previously discussed. The receiver 11 retrieves a frame vector for a present time as which the receiver 11 is attempting to detect the presence of a NB blemish signal in a particular frame. In step S103, the receiver 11 attempts to receive the WB signals as well as the NB signals, which vary on a frame-by-frame basis. The process then proceeds to step S105 where a query is made regarding whether the NB signal is detected within the window of time defined by a time slot for a frame. If the response to the query is negative, the receiver reports that lack of detection to the receiver's controller in step S107 so the controller can determine how to deal with the lack of detection of the NB signal. The controller may return to step S103 (one or more times) to attempt to receive the NB signal for the next frame before concluding that the NB signal is not present, and thus the WB signal cannot be authenticated and therefore has lower confidence than an authenticated WB signal. If not authenticated, the controller may take corrective action to terminate functions that rely on PNT information from the GNSS satellite or notify the user of a solution confidence reduction. This method and step S105 can work equally well under a condition where the WB signal is found first and then the search for the NB occurs afterward for corroboration of authentication.

If the response to query in step S105 is affirmative, the process proceeds to another query in step S109 regarding whether the WB signal was received. If so, the process proceeds to Step S110 where the signal is authenticated and PNT processing is performed on the WB signal. Subsequently, in step S111, another query is made to determine if the relative power level is consistent with the relative power index in the pattern vector. If the relative power, or a substantially higher WB power is not recently experienced, the process returns to S103. However, if the response to the query in step S111 is affirmative, it is a possible indication a smart jammer has come online and this possible change in jammer presence is reported to the controller in step S113, and then the process proceeds to step S119.

Returning to the query in step S109, if the response to the query is negative, the process proceeds to step S115 where the NB signal "blemish" is processed to acquire a more precise time of arrival estimate and consequently a secondary time and position estimation, as was discussed. Subsequently the process proceeds to step S117 where under the presumption that the satellite's WB signal is jammed or spoofed, the NB signal is used in step S117 for coarse time and position maintenance during the time that the WB signal is not authenticated and presumed to have denied WB PNT data available for use in applications. After step S117, the process proceeds to step S119, where another query is made regarding whether the next slot in a next frame that is occupied by the NB is expected to be transmitted/received. If the response is negative, the process returns to step S117. However, if the response is affirmative, the process returns to step S103.

Figure 12:
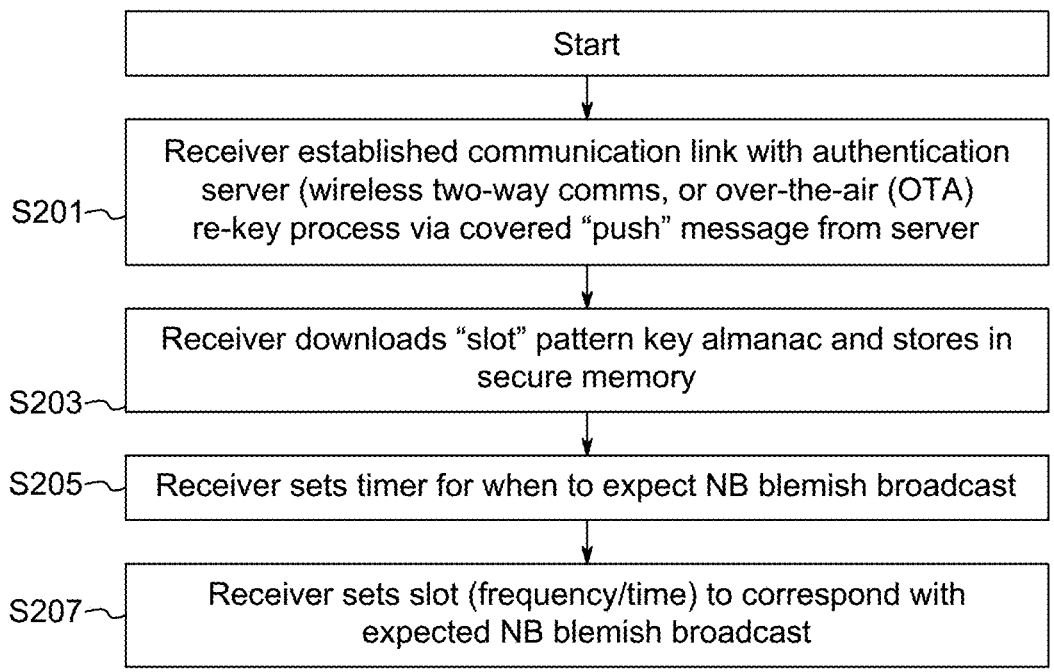
FIG. 12 is a flowchart of a process for reception of WB and NB signals so as to provide the receiver with a priori knowledge of the vector pattern that will be employed by the satellite for the NB signals frequency/time assignment and the NB and WB signals' relative power levels.

FIG. 12 is a flowchart of a process employed to prepare the GNSS receiver for reception of WB and NB signals so as to provide the receiver with a priori knowledge of the vector pattern that will be employed by the satellite for the NB signals frequency/time assignment and the NB and WB signals' relative power levels. The process begins in step S201 where the GNSS receiver 40 establishes a communication link with authentication server via hardline or wireless two-way communications, over-the-air (OTA) re-key process, or physical media delivery. In step S203, the server "pushes" vector pattern information (in an encrypted and/or compressed form) to the receiver 40 and the receiver 40 decrypts the vector patterns or vector pattern generation seed (used to seed a shift register-based generator, previously discussed) and saves them to local memory (or even a buffer memory when dynamically generated) later for retrieval and use at the appropriate time when attempting to receive a NB signal in a particular frequency and time slot in a given frame. The process then proceeds to step S205 where the receiver sets a timer or receives a time from a local, accurate time source, and determine from the time the next expected NB signal to be received from the satellite. The receiver then, in step S207, waits to receive the NB signal in a particular frequency/time slot in the next frame.

Figure 13:
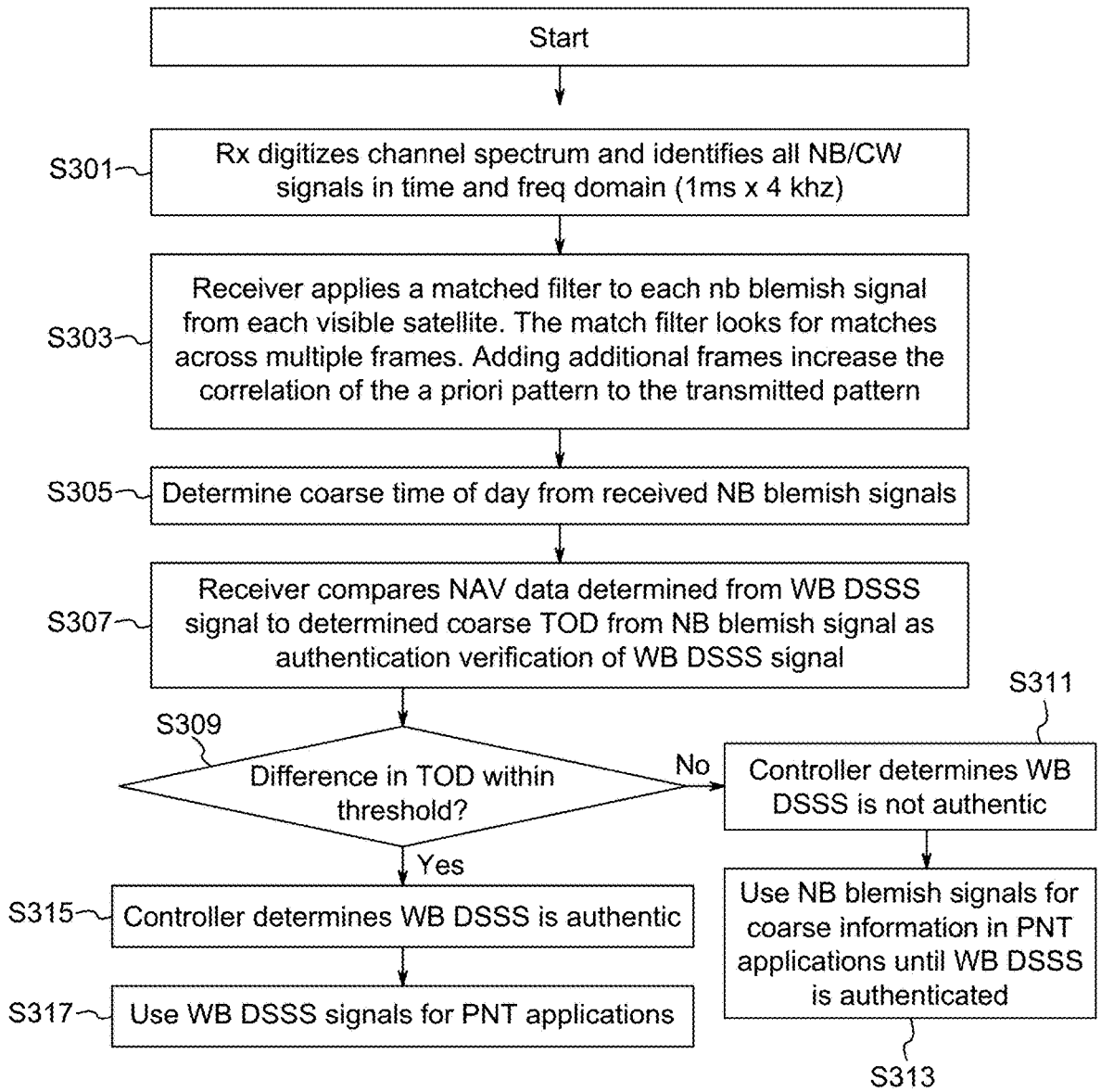
FIG. 13 is a flowchart of slot processing and a comparison process implemented at the receiver.

FIG. 13 is a flowchart of a slot processing and comparison process implemented at the receiver 40. The process begins in step S301 where the receiver digitizes the energy in the passband of band pass filter bank and identifies all NB (include continuous wave) signals in time and frequency in 1 ms slots within 4 kHz spectral occupancy. The process then proceeds to step S303 where the receiver 40 applies a matched filter to each NB blemish signal from each satellite in the system. In doing so the matched filter looks for matches across multiple frames, where adding additional frames increase correlation of the a priori vector pattern (stored at the receiver 40) to the vector pattern detected by the receiver. From the correlation result, the receiver 40 determines coarse time of arrival (Time of Day, TOD) the received signal because the vector pattern is known to occur at specific frames that are transmit a specific universal times. The process then proceeds to step S307 where the receiver 40 compares NAV data decoded and demodulated from WB DSSS signal to the coarse TOD derived from the NB signal as verify of the WB DSSS signal authenticity.

The process then proceeds to a query in step S309 where the query is made in regard to wither the difference in TOD is within a predetermined time frame (e.g., a second or less, so as to avoid a repeat jammer). If the response is negative, the process proceeds to step S311 where the controller determines the WB DSSS is not authentic and the process processed to step S313 where the receiver 40 uses the NB signal for coarse information to provide to PNT applications, and that coarse information is used until the WB DSSS is authenticated. However, if the response to the inquiry in step S309 is affirmative, the controller determines in step S315 at the WB DSSS signal is authentic and in step S317 the WB DSSS is used as a source of data for PNT applications.

Figure 14:
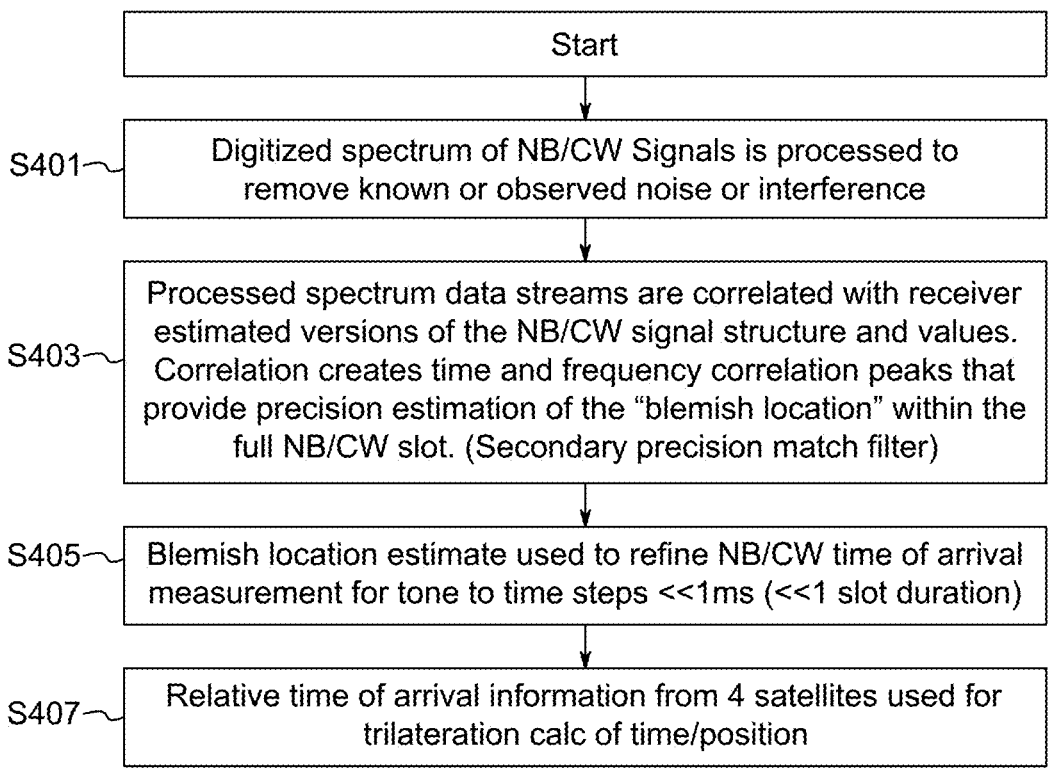
FIG. 14 is a flowchart of blemish processing and comparison.

FIG. 14 is a flowchart of blemish processing and comparison. The process starts in step S401 where the digital IF containing the NB and CW signals is processed to filter out known or expected noise and interference. The process then proceeds to step S403 where processed spectrum data streams are correlated with receiver estimated versions of the NB signal structure and values. A correlation process of the stored and received versions of the signal gives rise to time and frequency correlation peaks (i.e., correlated over candidate time slots, as well as candidate frequency options) so as to provide higher precision estimation of the NB signal's "location" within a particular frame. The process then proceeds to step S405 where the estimated location of the NB signal is used to refine the NB TOD measurements for tone-to-time steps much less than 1 ms. Subsequently, the process flows to step S407 where the relative time of arrival information from 4 or more satellites (the receiver being configured to perform parallel process for signal from each of the 4 or more satellites in parallel) is used in trilateration solution to derive time and position of the receiver from the received signals.

Figure 15:
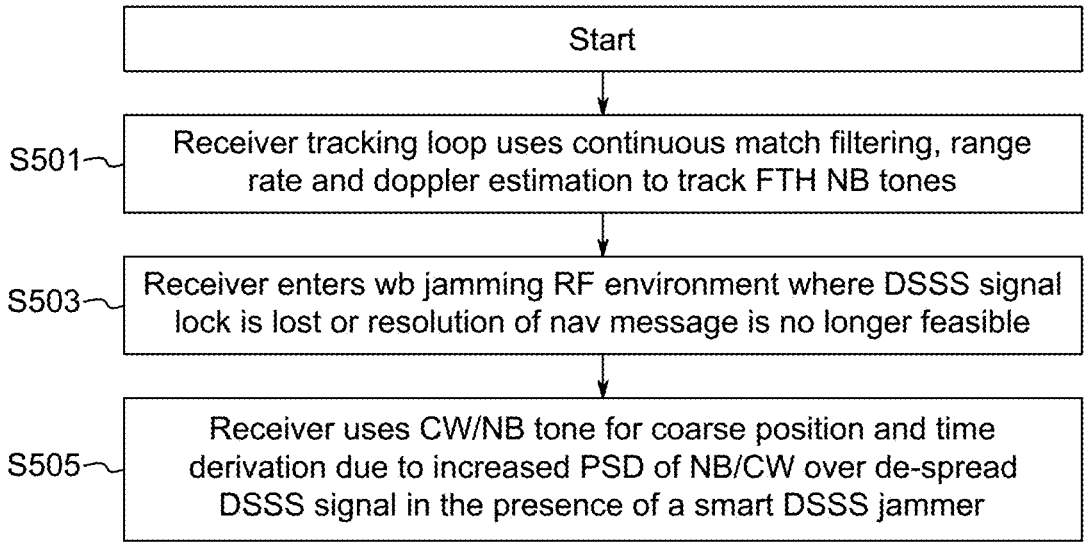
FIG. 15 describes a process for slot and NB signal tracking despite being in an a degraded environment caused by a jammer.

FIG. 15 describes a process for slot and NB signal tracking despite being in an a degraded environment caused by a jammer. The process begins in step S501 where the receiver 40 employs a tracking loops to continuous perform matched filtering, range rate and Doppler estimation to track frequency and time hopped NB signals. The process then proceeds to step S503 where the receiver 40 enters a jamming environment where the DSSS signal from the satellite is lost or of insufficient quality to provide reliable PNT data to applications that rely on it. The process then proceeds to step S505 where the receiver 40 relays on the NB signals for coarse position and time derivation because the power of the NB signal is concentrated in a narrow bandwidth and therefore will have substantially higher power spectral density than a WB jammer.

With respect to the controller, and other computer related circuitry described herein, the computer/processor resources may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RANI), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Figure 16:
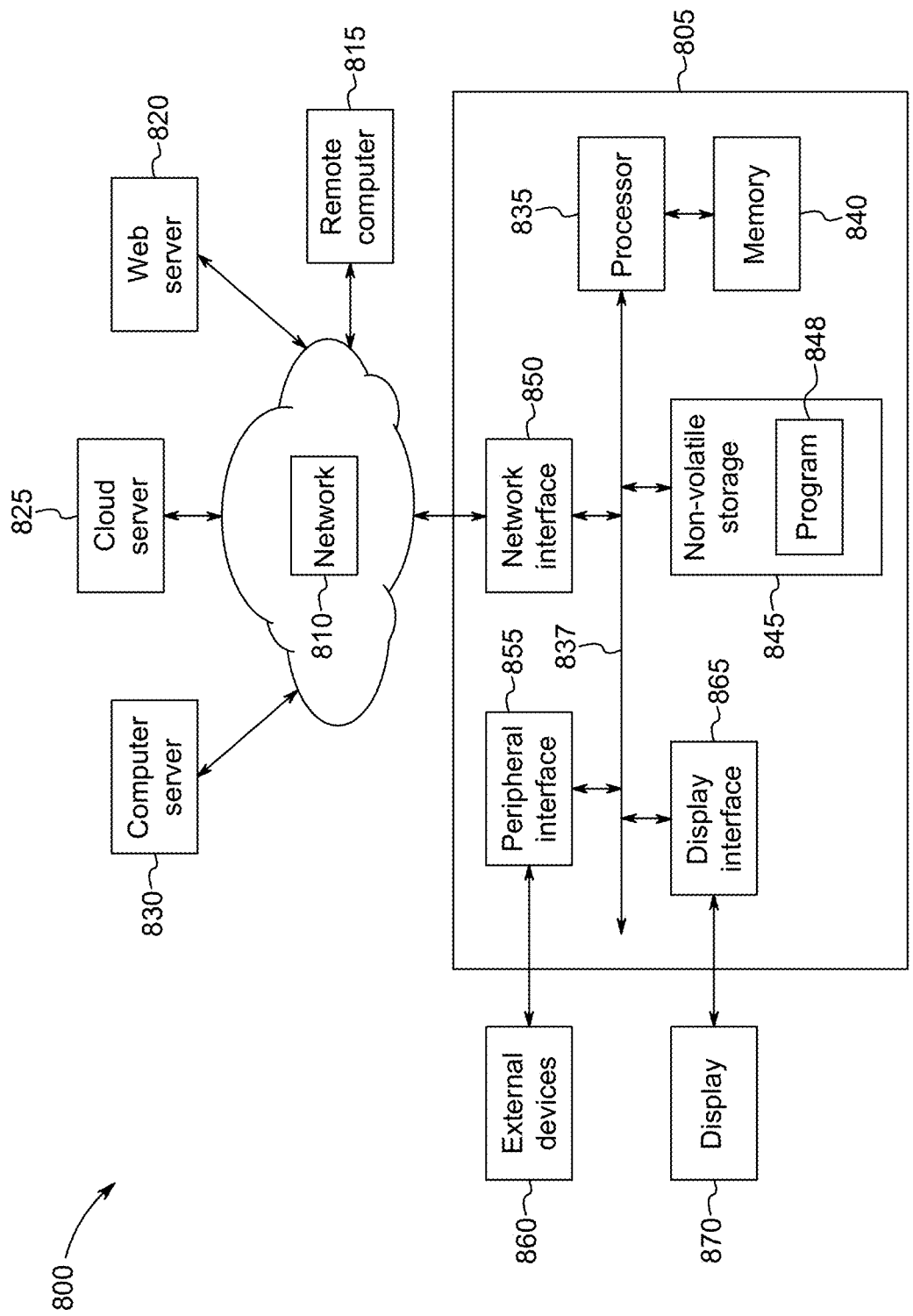
FIG. 16 is a functional block diagram illustrating a networked system of one or more networked computers and servers, including a computer that may be used herein as programmable control circuitry for use in either, or both, the receiver to transmitter to control operations and to host software based processes.

FIG. 16 is a functional block diagram illustrating a networked system 800 of one or more networked computers and servers. In an embodiment, the hardware and software environment illustrated in FIG. 16 may provide an exemplary platform for implementation of the software and/or methods according to the present disclosure.

Referring to FIG. 16, a networked system 800 may include, but is not limited to, control circuitry (e.g., computer) 805, network 810, remote computer 815, web server 820, cloud storage server 825 and computer server 830. In some embodiments, multiple instances of one or more of the functional blocks illustrated in FIG. 16 may be employed.

Additional detail of computer 805 is shown in FIG. 16, which may be used herein as programmable control circuitry in either, or both, the receiver to transmitter to control operations and to host software based processes. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

ELEMENTS

10: GNSS Satellite-based PNT system
11: Mobile Device with GNSS authentication receiver
12, 13, 14, 15: GNSS satellites
16: Jammer
17: Exclusive OR logic
19: Mixer
21: Additive communication channel
23: Narrowband Signature Signal Generator Circuitry
25: Controllable Switch/Combiner
27: GNSS Signal Generation Circuitry
29: Narrowband Signal Generator
31: Controllable Upconverter
33: High Power Amplifier
34A: High Power Amplifier for NB (time and frequency hopped signal)
34B: High Power Amplifier for WB
35: Transmit Antenna
36A: WB antenna
36B: Time Hop/Frequency Hop antenna
40: GNSS authentication receiver
41, 43: RF front end circuitry
42: DSSS Correlator and Measurement Engine
44: NB Measurement Engine
46: Baseband Processing Circuitry
48: User Interface
50: LNA
52: Local Oscillator (LO)
54: Frequency Synthesizer
56: WB Bandpass filter
57: Bandpass filter
58: Down Conversion circuitry
59A, 59B: Analog to Digital Converter
60: NB detection receiver
63: Time of Arrival (ToA) blemish processing circuitry
67: Coarse Slot Match Filter
71: PNT Processing Block
73: Authentication Processing Block
77: WB filter transfer function
78: NB filter transfer function
800: Networked System
805: Control Circuitry
806: Control and Synchronization Circuitry
810: Network
815: Remote computer
820: Web Server
825: Cloud Storage Server
830: Computer Server
835: Processor
837: Bus
840: Memory
845: Non-volatile storage
848: Program (computer executable instructions)
850: Network Interface
855: Peripheral Interface
860: External Devices
865: Display Interface
870: Display Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A receiver that authenticates global navigation satellite system (GNSS) transmissions, the receiver comprising:

a memory that has stored therein:
  a first vector for a first transmission frame that identifies a first frequency slot and a first time slot in which a first segment of a narrowband (NB) signal is transmitted from a satellite, and
  a second vector for a second transmission frame that identifies a second frequency slot and a second time slot in which a second segment of the NB signal is transmitted from a satellite, the first vector and the second vector being vectors in a vector pattern that define time and frequency slots for segments of the NB signal in successive transmission frames in which the satellite transmits the NB signal;
wideband (WB) receiver circuitry configured to receive, de-spread and extract data from a WB signal transmitted from the satellite, the data in the WB signal having been spread at the satellite with a spreading code that expands a spectral occupancy of the data by at least a factor of 10 relative to transmission of the data without the spreading code with a same modulation scheme; and
NB receiver circuitry configured to receive the first segment of the NB signal in the first transmission frame and the second segment of the NB signal in the second transmission frame; and
control circuitry operatively connected to the memory, the WB receiver circuitry and the NB receiver circuitry,
wherein the control circuitry is configured to:
  compare receipt time and receipt frequency of the first segment of the NB signal with the frequency slot and time slot identified in the first vector to determine to whether there is a first match,
  compare receipt time and receipt frequency of the second segment of the NB signal with the frequency slot and time slot identified in the second vector to determine to whether there is a second match, and
  determine whether or not the WB signal is an authentic transmission from the satellite, wherein the control circuitry is further configured to:
    determine that the WB signal is an authentic transmission from the satellite under a condition that both the first match and the second match exist, and permit the data contained in the WB signal to be passed to the application that uses the at least one of time, position or velocity information derived from the WB signal, and
    under a condition that at least one of the first match or the second match do not exist, determine that the WB signal is not an authentic transmission from the satellite and prevent the data contained in the WB signal from being passed to the application that uses the at least one of time, position or velocity information derived from the WB signal.

2. The receiver of claim 1, wherein
the first vector and the second vector each include a third index that defines a relative power of the NB signal to the WB signal in a bandwidth that is smaller than a bandwidth of the WB signal, and
the control circuitry is configured to compare the relative power of the NB signal to the WB signal.

3. The receiver of claim 2, wherein the control circuitry is configured to determine that the first match and the second match exists when the first match and the second match each include a match of the relative power within a respective predetermined margin.

4. The receiver of claim 1, wherein the control circuitry is further configured to inform an application that uses PN position, navigation and time (PNT) data from the WB signal that the PNT data is not authentic data from the satellite.

5. The receiver of claim 1, wherein under the condition that at least one of the first match or the second match is not satisfied, the control circuitry is further configured to provide the application with coarse position, time, velocity information derived from the first segment of the NB signal and the second segment of the NB signal received from the satellite as well as from NB segments received from at least two other satellites in lieu of the data contained in the WB signal.

6. The receiver of claim 1, wherein the WB receiver circuitry comprises:
  an analog to digital converter that digitizes a spectrum occupied by the WB signal; and
  measurement circuitry configured to detect the data contained in the WB signal.

7. The receiver of claim 1 wherein the NB receiver circuitry comprises a matched filter and is further configured to detect a presence or absence of each of the first and second segments of the NB signal by determining whether an output of the matched filter exceeds a detection threshold.

8. The receiver of claim 1 wherein, the NB receiver circuitry is configured to
  use an input from a local time source to perform detection of each of the first and second segments of the NB signal within the associated transmission frame, and
  correlate results for all transmission frames occurring within a 1 second interval of a transmission frame expected to be received at the local time so as to identify which transmission frame corresponds with the transmission frame for the transmission from the satellite.

9. The receiver of claim 1, wherein the control circuitry is configured to detect offsets in relative power, time, and frequency of the NB signal, wherein the detected offsets in relative power, time, and frequency of the NB signal are related to a relative range between the receiver and the satellite and a rate of change in the relative range.

10. The receiver of claim 9, wherein, the control circuitry is configured to use the relative range and the rate of change of range of the NB signal to determine receiver course position, receiver velocity, and receiver synchronization information that is independent of the data contained in the WB signal.

11. The receiver of claim 1, wherein the NB receiver circuitry and the WB receiver circuitry are respectively configured to receive the NB signal and the WB signal even though the NB signal is transmitted by the satellite at the same time or on a same transmission bandwidth as the WB signal.

12. The receiver of claim 1, wherein each of the first and second segments of the NB signal are separated in time at a fixed interval or are separated in time based on an a priori pseudorandom pattern.

13. The receiver of claim 1, wherein the memory holds the first vector and the second vector in a lookup table, or as a register that holds data produced dynamically by a code generator.

14. The receiver of claim 1, wherein each of the first and second segments of the NB signal are transmitted pseudo randomly in frequency based on an a prior pseudorandom pattern.

15. The receiver of claim 1, wherein each of the first and second segments of the NB signal are transmitted pseudo randomly in time and frequency based on a pattern transmitted as data on a data channel portion of the WB signal as one or more transmission frames earlier in time than a transmission frame expected by the control circuitry at a given local time.

16. The receiver of claim 1, wherein the control circuitry is configured to detect data bits modulated into a phase changes in the NB signal.

17. The receiver of claim 1, further comprising:
a first RF front end that provides analog processing on the WB signal; and
a second RF front end that provides analog processing on the NB signal.

18. A method for authenticating global navigation satellite system (GNSS) transmissions by a device that includes a memory, wideband (WB) receiver circuitry, narrowband (NB) receiver circuitry and control circuitry, the method comprising:
storing in the memory:
a first vector for a first transmission frame that identifies a first frequency slot and a first time slot in which a first segment of a NB signal is transmitted from a satellite, and
a second vector for a second transmission frame that identifies a second frequency slot and a second time slot in which a second segment of the NB signal is transmitted from a satellite, the first vector and the second vector being vectors in a vector pattern that define time and frequency slots for segments of the NB in successive transmission frames in which the satellite transmits the NB signal;
receiving, dispreading and extracting data from a WB signal using the WB receiver circuitry, the WB signal transmitted from the satellite, the data in the WB signal having been spread at the satellite with a spreading code that expands a spectral occupancy of the data by at least a factor of 10 relative to transmission of the data without the spreading code with a same modulation scheme;
receiving with the NB receiver circuitry the first segment of the NB signal in the first transmission frame and the second segment of the NB signal in the second transmission frame;
comparing a receipt time and a receipt frequency of the first segment of the NB signal with the frequency slot and time slot identified in the first vector to determine whether there is a first match,
comparing a receipt time and a receipt frequency of the second segment of the NB signal with the frequency slot and time slot identified in the second vector to determine to whether there is a second match, and
determining whether or not the WB signal is an authentic transmission from the satellite, wherein the determining whether or not the WB signal is an authentic transmission comprises:
under a condition that both the first match and the second match exist, determining that the WB signal is an authentic transmission from the satellite, and permitting the data contained in the WB signal to be passed to an application that uses at least one of time, position or velocity information derived from the WB signal, and
under a condition that at least one of the first match or the second match do not exist, determining that the WB signal is not an authentic transmission from the satellite and preventing the data contained in the WB signal from being passed to the application that uses the at least one of time, position or velocity information derived from the WB signal.

19. A non-transitory computer readable memory that includes computer readable instructions that when executed by a device that includes a memory, wideband (WB) receiver circuitry, narrowband (NB) receiver circuitry and control circuitry, cause the device to perform a receive process, the receive process comprising:
storing in the memory:
a first vector for a first transmission frame that identifies a first frequency slot and a first time slot in which a first segment of a NB signal is transmitted from a satellite, and
a second vector for a second transmission frame that identifies a second frequency slot and a second time slot in which a second segment of the NB signal is transmitted from a satellite, the first vector and the second vector being vectors in a vector pattern that define time and frequency slots for segments of the NB in successive transmission frames in which the satellite transmits the NB signal;
receiving, dispreading and extracting data from a WB signal using the WB receiver circuitry, the WB signal transmitted from the satellite, the data in the WB signal having been spread at the satellite with a spreading code that expands a spectral occupancy of the data by at least a factor of 10 relative to transmission of the data without the spreading code with a same modulation scheme;
receiving with the NB receiver circuitry the first segment of the NB signal in the first transmission frame and the second segment of the NB signal in the second transmission frame;
comparing a receipt time and a receipt frequency of the first segment of the NB signal with the frequency slot and time slot identified in the first vector to determine whether there is a first match,
comparing a receipt time and a receipt frequency of the second segment of the NB signal with the frequency slot and time slot identified in the second vector to determine to whether there is a second match, and
determining whether or not the WB signal is an authentic transmission from the satellite, wherein the determining whether or not the WB signal is an authentic transmission comprises:
under a condition that both the first match and the second match exist, determining that the WB signal is an authentic transmission from the satellite, and permitting the data contained in the WB signal to be passed to an application that uses at least one of time, position or velocity information derived from the WB signal, and
under a condition that at least one of the first match or the second match do not exist, determining that the WB signal is not an authentic transmission from the satellite and preventing the data contained in the WB signal from being passed to the application that uses the at least one of time, position or velocity information derived from the WB signal.

* * * * *